(12) United States Patent
Tschida

(10) Patent No.: US 7,377,361 B1
(45) Date of Patent: May 27, 2008

(54) COLLAPSIBLE TREE STAND

(76) Inventor: Neil Tschida, 437 Goodhue St., St. Paul, MN (US) 55102

( * ) Notice: Subject to any disclaimer, the term of this patent is extended or adjusted under 35 U.S.C. 154(b) by 485 days.

(21) Appl. No.: 11/063,464

(22) Filed: Feb. 23, 2005

Related U.S. Application Data

(60) Provisional application No. 60/546,284, filed on Feb. 23, 2004, provisional application No. 60/546,220, filed on Feb. 23, 2004.

(51) Int. Cl.
*A01M 31/02* (2006.01)
(52) U.S. Cl. .................................. 182/188; 182/187
(58) Field of Classification Search ............... 182/187, 182/188, 116, 135, 136
See application file for complete search history.

(56) References Cited

U.S. PATENT DOCUMENTS

| | | | |
|---|---|---|---|
| 3,664,460 A * | 5/1972 | Zdroik ................. | 182/187 |
| 4,553,634 A * | 11/1985 | Roberts et al. ....... | 182/134 |
| 5,339,922 A * | 8/1994 | Beechler .............. | 182/188 |
| 5,538,101 A * | 7/1996 | Kempf ................ | 182/116 |
| 6,722,472 B2 * | 4/2004 | Berkbuegler ......... | 182/187 |
| 6,883,644 B1 * | 4/2005 | Braun et al. ......... | 182/187 |

* cited by examiner

*Primary Examiner*—Alvin C Chin-Shue
(74) *Attorney, Agent, or Firm*—D L Tschida

(57) ABSTRACT

A tree stand for use in hunting and observing wildlife that includes a collapsible platform and collapsible seat support assembly. In several constructions, a platform assembly includes several pivot joints that permit multiple platform sections to fold together. The folding sections may also include frame members that fan fold together. An adjoining seat support and/or seat assemblies fold with the platform to widths that accommodate transport. In several other platform constructions, the platform assembly includes several pivot joints that permit perimeter, interior and end frame members and/or multi-section stays to fold. Underlying cross supports, end straps, end caps and wires stabilize and maintain the displacement of the platform frame members and stays. Several alternative seat support assemblies, platform and sling seat assemblies, cable and strap supports are also disclosed in various tree stand combinations.

11 Claims, 34 Drawing Sheets

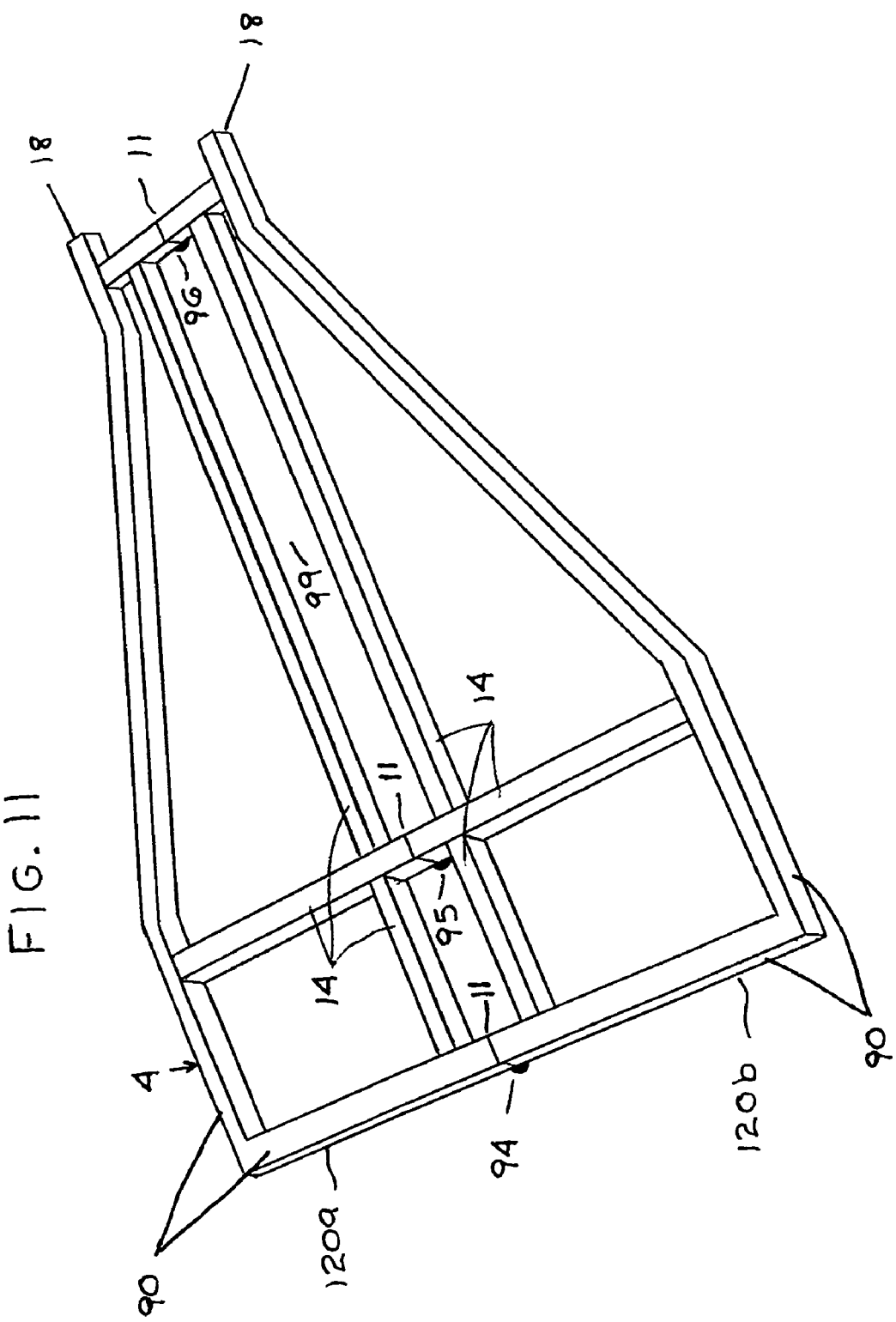

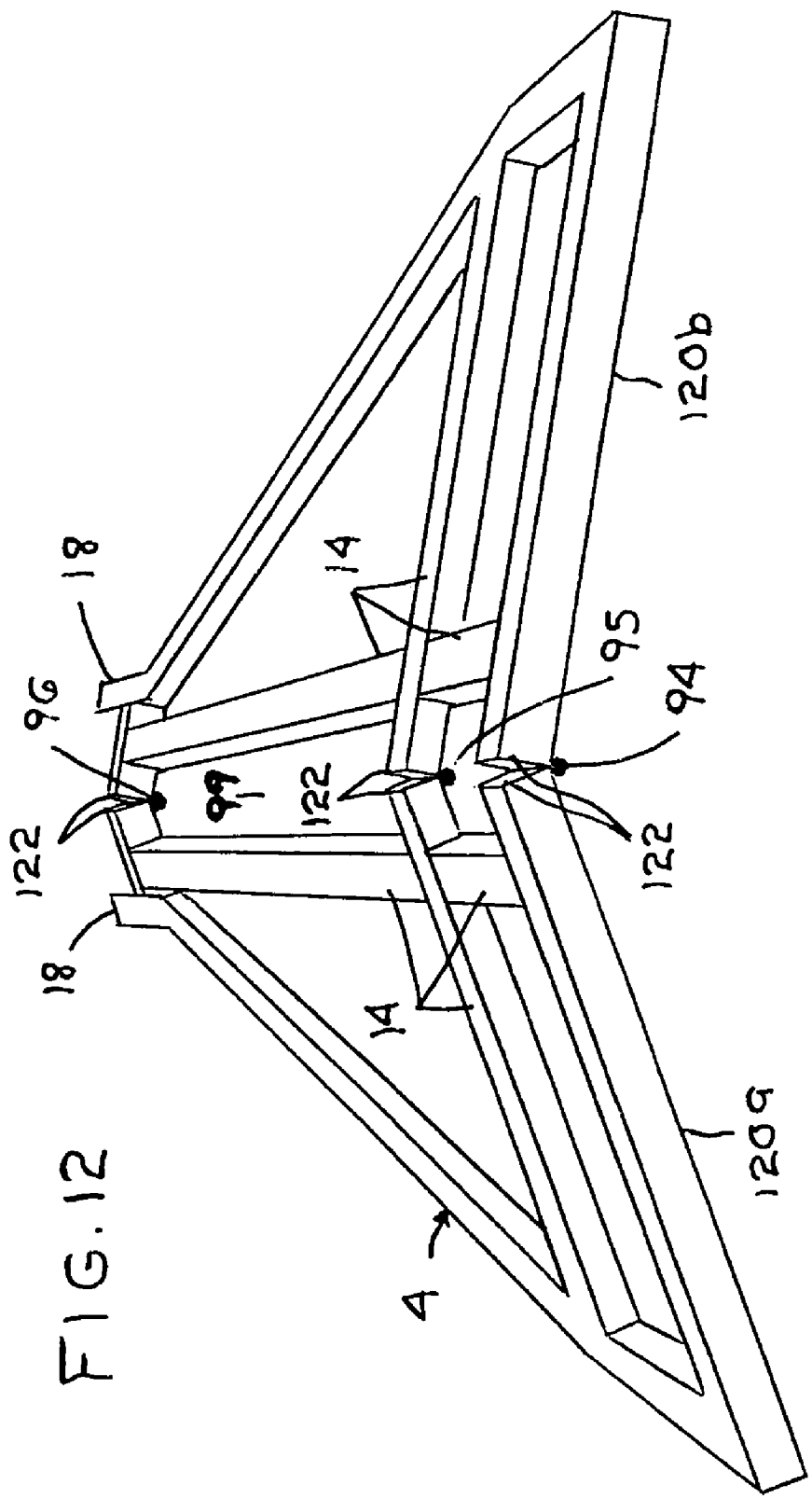

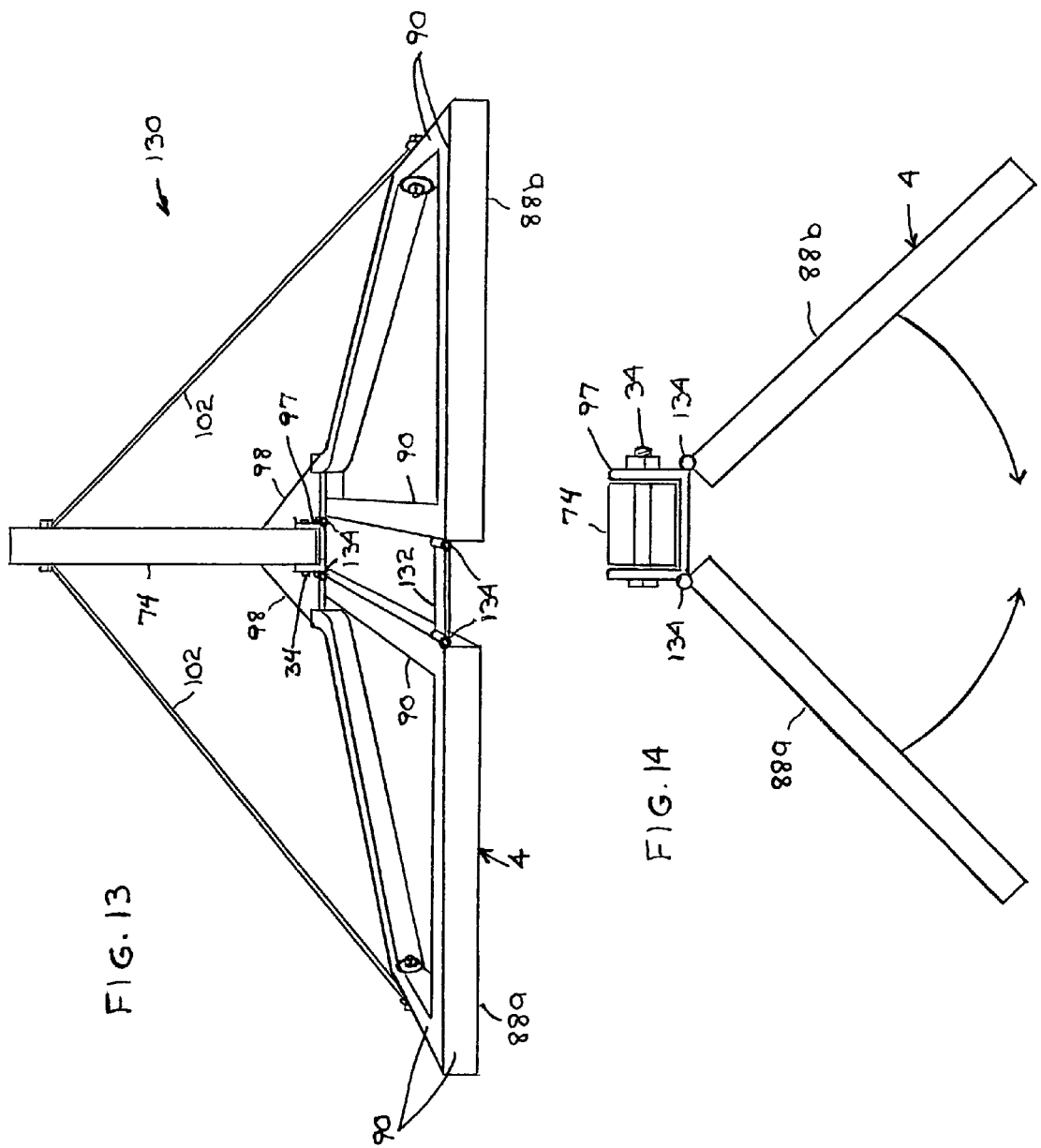

COLLAPSIBLE TREE STAND

RELATED U.S. APPLICATIONS

Non-provisional of provisional application No. 60/546,284 filed Feb. 23, 2004 and provisional application No. 60/546,220 filed Feb. 23, 2004.

BACKGROUND OF THE INVENTION

The present invention relates to portable hunting stands and, in particular, to a stand adapted to mount to a tree and that includes a collapsible and/or hinged platform.

A problem with tree stands is their size. Those with larger platforms provide more foot space to accommodate necessary movement while in the tree, but on the ground are harder to carry. That is, the width of the stand can be cumbersome during transport, either by a handle or supported on the back, through the woods when the stand can bump into trees and/or catch on brush and tree branches and all of which create undesired noise and inconvenience the hunter. Some stands also provide ladders or sectional upright towers, which are even more cumbersome to transport.

A typical commercially available portable tree stand consists of a horizontal support platform that is hinged to ail upright, vertical frame assembly. Cables may extend from the vertical frame to the platform to fix the maximum relative range of rotation of the platform and upright frame. A seat belt, rope, chain or other suitable length of fastener material is secured to the vertical frame to wrap around a tree and fasten to a mating fastener at the stand to secure the stand to the tree. Threaded fasteners or other auxiliary fasteners may also be provided to secure the vertical frame to the tree. Some stands provide means for leveling the platform.

The vertical frame can provide one or more displaced, upright members. The vertical frame also typically supports a seat assembly. The seat can comprise a sling arrangement or a rigid, padded seat that depends from the vertical frame. The seat can be permanently mounted to the vertical support piece(s) or be removable. The seat may also permit rotational movement.

The platform typically comprises a closed or open construction constructed of wood, steel or aluminum. The platform is sized to permit some nominal movement of the feet and maneuvering by the hunter. The platform is typically constructed to be rigid and support individuals weighing up to 300 pounds. Metal platforms can provide a solid, mesh or framed floor. Mesh floors typically are welded to perimeter frame pieces. Framed floors typically provide a number of tubular members that are fabricated into a matrix with intervening open spaces to shed water, snow etc. A thermal insulated and/or traction mat can be supported on the platform.

The geometric configuration and dimensions of a portable platform can vary widely. Typical rectangular platforms might exhibit a width in the range of 18 to 30-inches and a depth of 20 to 36-inches. Depending upon the materials, the weight of the stand assembly can correspondingly vary from 5 to 55 pounds.

Although large stands accommodate hunter movement, they tend to be heavy and cumbersome during transport and/or when being suspended from a tree. Stands can be carried by a handle or more typically are supported on the back via straps in a backpack fashion. Large platforms consequently extend well beyond the shoulders of the hunter, where the platform can strike intervening brush, trees etc. The length of the stand can also interfere with leg movement by striking the back of the legs.

The subject invention was developed to provide a lightweight, portable tree stand having a relatively large platform that is easy to carry through the woods, yet allows plenty of room for hunter movement while in the tree. A variety of alternative designs have been developed that allow a vertical frame assembly to fold flat relative to a multi-section platform. The platform is constructed in multiple sections that partially disassemble and/or are hinged to fold in sections and/or fan fold multiple frame members together to effectively reduce the width of the platform assembly in a closed or transport condition. The folded width is approximately one half the open width. An opened stand platform occupying a relatively large area is thereby obtained, yet the overall width of the assembly does not appreciably extend beyond the shoulders during transport in a backpack configuration. A variety of pivoting brackets, detachable supports, hinged retainers, stops and overlapping frame pieces stabilize and reinforce the folding frame sections. Notched latches also accept hook ends at the cable supports to provide a quick leveling adjustment.

SUMMARY OF THE INVENTION

It is a primary object of the invention to provide a tree stand with a collapsible platform.

It is a further object of the invention to provide a tree stand with a collapsible platform that can be constructed in a variety of different hinged designs with pivoting sections and frame members.

It is a further object of the invention to provide a tree stand with a collapsible platform that can be adapted to other existing tree stands of different styles and designs and using different methods of attachment to trees.

It is a further object of the invention to provide a multi-section platform having pivots or hinges mounted to permit folding the platform sections lengthwise onto one another along a longitudinal axis to a transport condition and fold flat to an open condition and wherein suitable supports prevent collapse.

It is a further object of the invention to provide an upright assembly that independently folds flat onto the platform and/or separately folds with the platform.

It is a further object of the invention to provide platform sections constructed of tubular frame pieces and/or mesh grills and cross supports that underlie the open platform or latch supports that stabilize joints between frame members to prevent collapse.

It is a further object of the invention to provide platform sections constructed of frame members that separately fan-fold together to further reduce the width of the platform in the transport condition.

It is a further object to provide straps to limit the expanded displacement of adjoining frame members.

It is a further object of the invention to provide multi-section uprights that fold into parallel alignment with the platform and independently fold longitudinally with the platform.

It is a further object of the invention to provide portable sling and platform seats that project from the upright frame and either fold flat with the assembly or detach from the assembly.

It is a further object of the invention to provide means for varying the length of cables trained between the upright frame and platform to vary the angular relation of one to the other to compensate for the lean angle of a supporting tree.

The foregoing objects, advantages and distinctions, among others, are obtained in one tri-fold construction of the invention wherein one or a pair of vertical uprights are hinged to first and section platform sections configured from welded frame pieces. The uprights are coupled to fold flat to the platform and parallel to a longitudinal axis at the platform. The platform sections, in turn, are hinged and attached to one another at longitudinal pivots or hinges. A channel latch piece is secured to the platform to latch the platform section joints in an open condition and nest to one of the sections in the transport condition. Upon release of the latch piece, the platform sections and uprights each fold to define an assembly width approximately one-half the width of the opened stand. A sling seat with sewn loops mounts to hinged arms that laterally extend from the upright members and the hinged truss frame. Cables trained between the uprights and platform limit the relative rotation of one to the other. Brackets at the uprights are provided with selective cable fasteners can vary the cable length and compensate for trees with different leaning orientations.

In another bi-fold construction, an upright support is hinged to a pair of mesh platform sections coupled at center hinges. A removable cross brace spans the platform sections when opened to stabilize the platform. Cables extend between the upright support and platform. A seat arm detachably mounts in generally orthogonal relation to the upright support and supports a padded seat platform.

In another bi-fold stand, the platform is constructed of a number of longitudinal tubular frame members or pieces that extend from peripheral border members and are independently hinged to fan-fold in and out of parallel alignment to one another. A flexible retainer or strap is secured to each frame piece to fix the relative displacement of each to the others and in cooperation with a cross support provides a stable platform. When opened, the longitudinal frame pieces are fanned outward and held by the spacing strap. Cables extend between the upright frame and border members at the platform. When collapsed, the upright and platform sections fold flat and the frame borders and longitudinal frame pieces separately fold together as two sections to reduce the width of the platform assembly to less than one-half its expanded width. Pivoting brackets with several notches couple to mating cable ends to provide leveling adjustment.

Several other tree stands are also disclosed having fan-fold platforms. The platforms provide interior frame members displaced between perimeter members, multiple, solid platform sections and/or multi-section stays displaced between perimeter frame members. Appropriate pivot joints are provided to permit the collapse or fan folding of the platforms within the plane of an open condition of the platform. Straps and/or rigid end caps restrain the frame members relative to each other. Crossbeams provide underlying support to the platforms. The platforms are combined with a number of different seat support assemblies, seat assemblies, latches, cable length adjusters and mounting straps.

Still other objects, advantages and distinctions of the invention will become more apparent from the following description with respect to the appended drawings. To the extent alternative constructions, improvements or modifications have been considered, they are described as appropriate. It is to be appreciated the improvements may be included alone or in different combinations in alternative stand assemblies. The description should therefore not be literally construed in limitation of the invention. Rather, the scope of the invention should be broadly interpreted within the scope of the further appended claims.

BRIEF DESCRIPTION OF THE DRAWINGS

Like reference numerals refer to like structure at the various drawings and which are as follows:

FIG. 11 is a perspective view of a platform frame for a tree stand having three pivot joints shown in the open position.

FIG. 12 is a perspective view of the platform frame of FIG. 11 partially folded to expose the abutting stop surfaces at each pivot joint.

FIG. 13 is a front perspective view of a two-section, tree stand frame having a single upright seat support shown in an open condition and wherein the platform sections fold on dual pivots.

FIG. 14 is a plan view of the tree stand frame of FIG. 13 with the upright seat support folded down and the platform sections partially folded together.

DESCRIPTION OF THE PREFERRED EMBODIMENT

Figure 1:
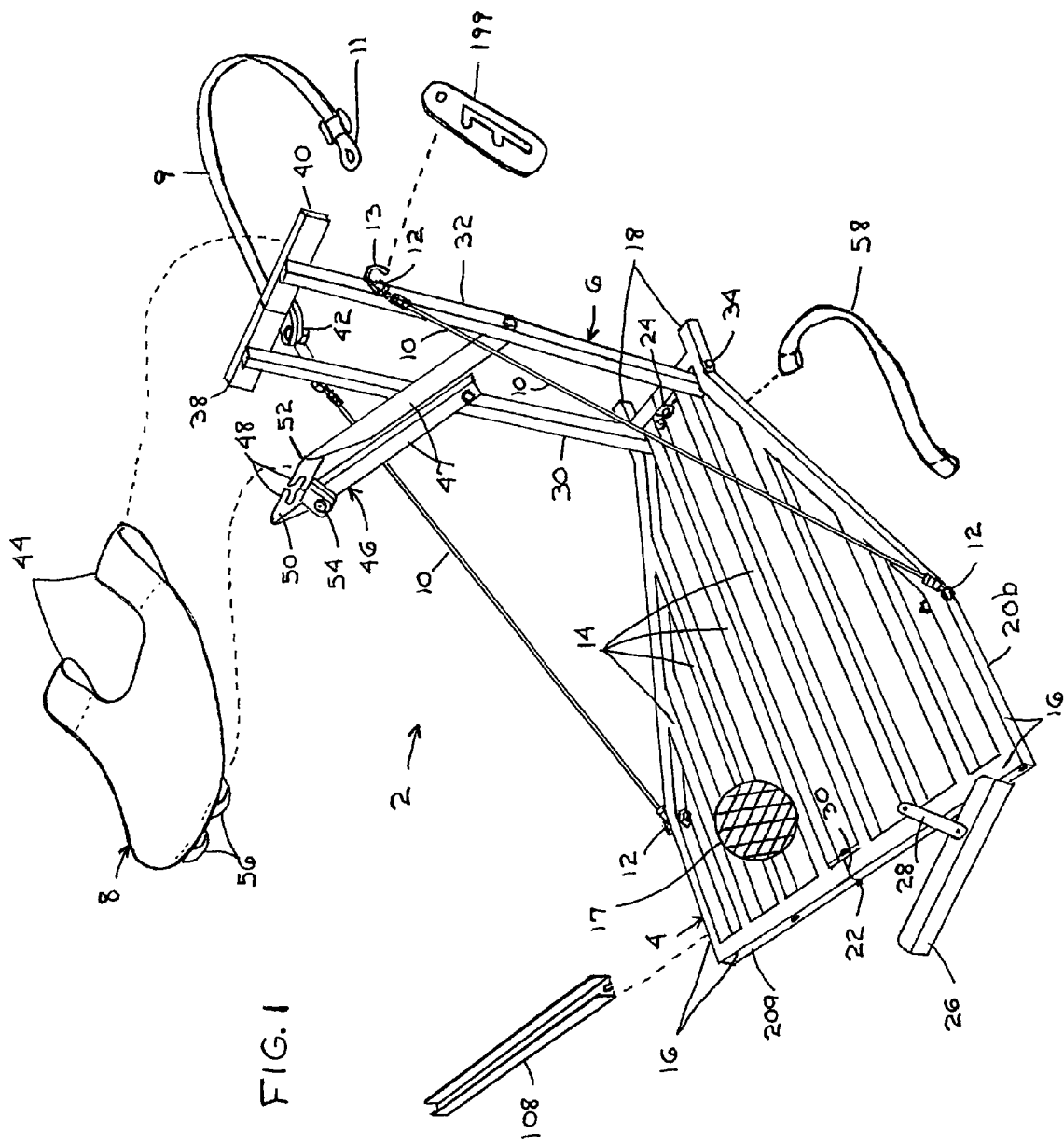
FIG. 1 is a perspective view of a tree stand with a two-section, bi-fold platform and a multi-upright seat support of the invention in a partially assembled condition.

Referring to FIG. 1, a perspective drawing is shown to a presently preferred construction of a collapsible tree stand 2 of the invention. The stand 2 provides a multi-section platform 4, a multi-section upright seat support assembly 6 and a sling seat 8. Cables 10 extend between the platform 4 and seat support assembly 6 to limit the relative angular orientation of one to the other. Suitable fasteners 12 secure crimped, looped ends of the cables 10 to the periphery of the platform 4 and adjacent the top of the seat support assembly 6.

The cables 10 are formed of multi-stranded materials selected to withstand exposure to the environment, the normal support load (e.g. up to 300 pounds) and stresses placed on the platform 4. An end of each cable 10 can include can include a fastener with multiple holes, notches or the like or other length adjuster devices can be provided to permit adjustment of the cable length to compensate for the lean angle of a tree. One exemplary notched clip 199 is shown that can be attached to the fasteners 12 (e.g. bolt/nut or eyebolt/nut) at both sides of the upright assembly 6 to permit adjustment of the looped ends of the cables 10.

A retainer strap 9 having a suitable end fastener 11 also extends from one of the fasteners 12 at the seat support assembly 6. The strap 9 is sized to extend around the circumference of a support tree. The end fastener 11 is constructed to mate with an interlocking fastener 13 at the opposite side of the upright assembly 6. The fasteners 11 and 13 can comprise a passive hook and loop or an active interlocking mechanism (e.g. seat belt buckle or other latching buckle). The fasteners 11 and 13 or suitable other buckles or fasteners can also be fitted to the straps 9 to allow adjustment to the length of the strap 9 and enable a preferred tension around the tree. The strap 9 can be constructed of rope, chain, webbing or any variety of low-stretch, environmentally stable materials.

Figure 2:
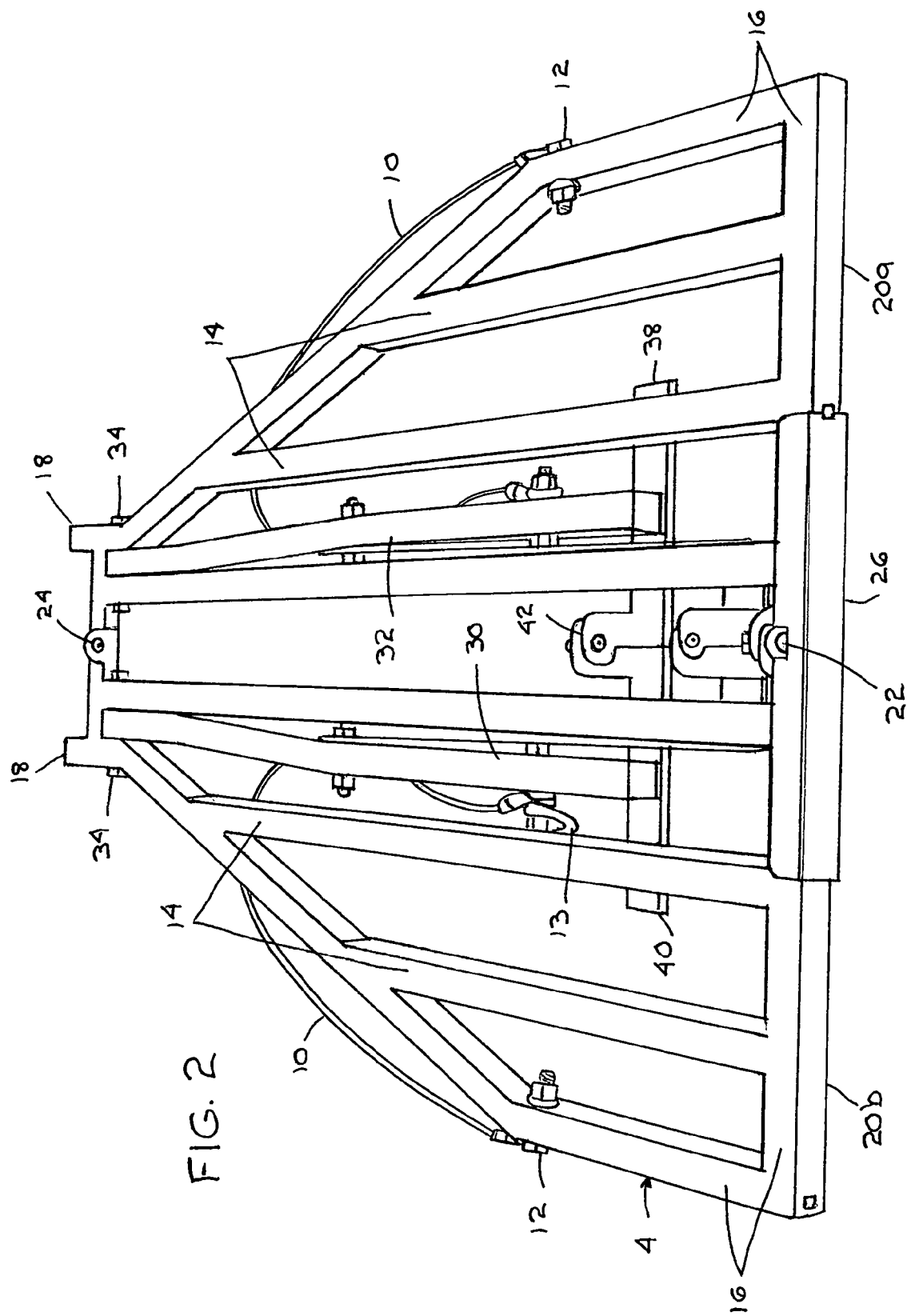
FIG. 2 is a detailed perspective view to the platform of FIG. 1 folded and latched open.

The platform 4, also shown in an enlarged, folded-open condition at FIG. 2, is constructed of a number of tubular interior frame pieces 14 that mount, such as by welding, to border or perimeter frame pieces 16. The frame pieces 14 can be constructed of many different materials in any shape and combination, such as square or round tubing, channel, I-beam, expanded mesh, wood, metal or composites. Tubular or solid frame material able to withstand the loads and conditions without bending and/or unduly flexing (e.g. steel, aluminum, titanium, KEVLAR, plastics or composites) are preferred.

Tubular aluminum or steel pieces 14 of relatively high tensile strength are presently used. The platform 4 can be formed to any desired size or shape. A mesh material 17 (shown in cutaway) can alternatively be supported between selected ones of the frame pieces 14 and 16 or can be mounted over the frame pieces 14 as desired. A mat with or without thermal insulation and/or non-skid materials might also be mounted on or secured to the platform assembly 4.

Tail pieces 18 project from the rear of the platform 4 to contact a tree. The ends of the tail pieces 18 can be shaped to penetrate the tree and/or generally promote frictional contact with the tree. For example, the pieces 18 can be cut to different angles and/or include weldments with points or sawtooth patterns to enhance gripping.

Figure 3:
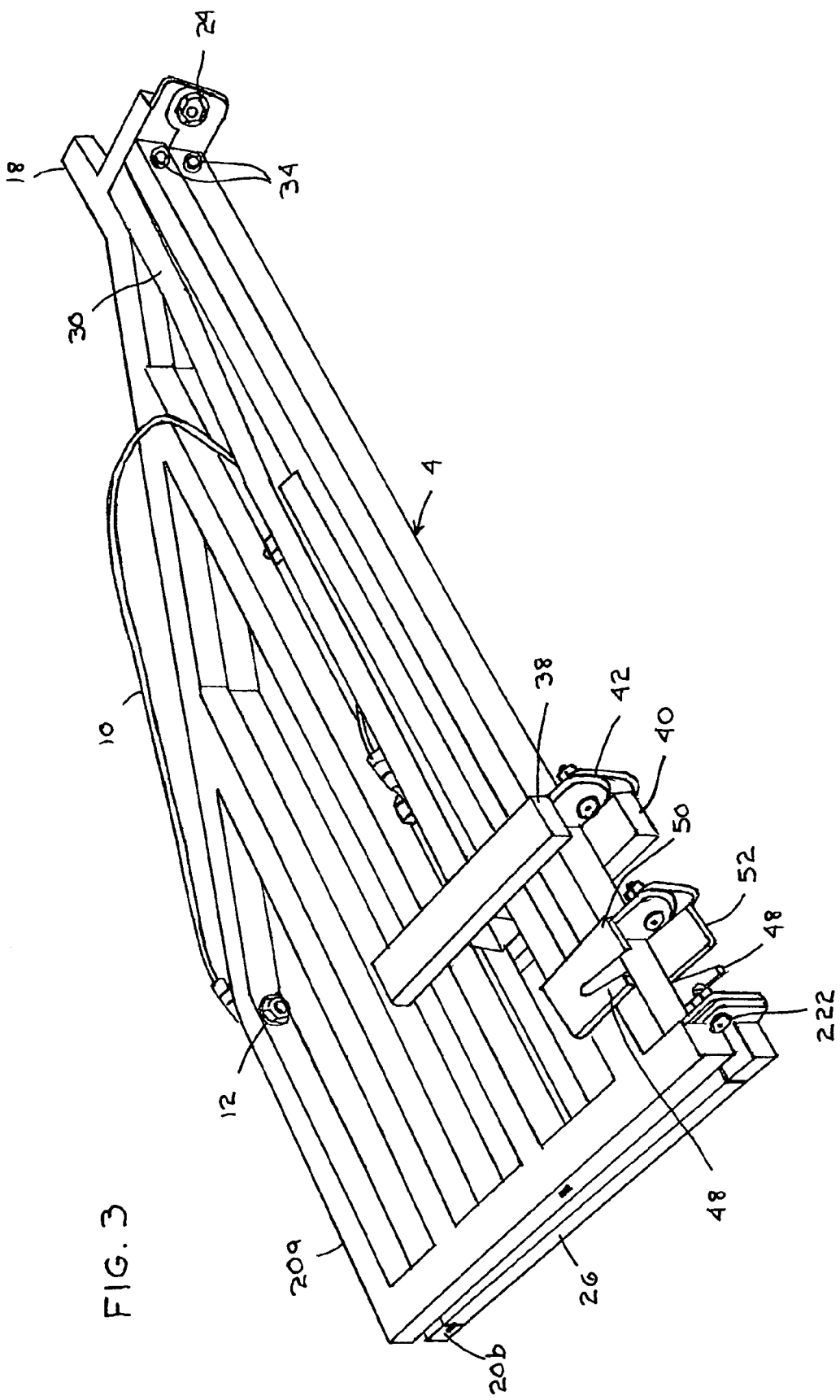
FIG. 3 is a detailed perspective view to the bottom of the platform and seat support of FIG. 1 folded in half.

The platform 4 is formed into two half-sections 20*a* and 20*b*. The sections 20*a* and 20*b* are mounted to pivot relative to one another at fore and aft hinges 22 and 24 that depend from the platform 4. The hinges 22 and 24 are centered along a longitudinal midline of the platform 4. The hinges 22 and 24 allow the sections 20*a* and 20*b* to fold flat onto one another as shown in FIG. 3. The folded platform assembly 4 collapses to half the width of the opened stand 2. Depending upon the configuration of the platform 4, additional hinges 22 and/or 24 can be provided to appropriately facilitate folding of longitudinal or transverse lateral sections that may also be provided.

A latch 26 is secured to the platform 4 with a hinge arm 28 and located to pivot and overlie the seam or joints 30 between the sections 20*a* and 20*b*. The latch 26 is presently constructed of a C-shaped channel member and into which the border or perimeter pieces 16 nest. Other types of latches 26 can be used. The latch 26 reinforces the abutting ends of the perimeter pieces 16 at the seam 30 to stabilize and prevent the sections 20*a* and 20*b* from collapsing at the hinges 22 and 24 when the platform 4 is folded open. The hinges 22 and 24 also include flanges or stop surfaces that prevent the hinges 22 and 24 from over-rotating past 90°. A single latch 26 is presently used at the hinge 22, although another latch 26 can be included adjacent the hinge 24. Other cross-members 108 can also be fitted beneath the platform 4 to stabilize and support the platform 4.

The upright seat support assembly 6 is constructed of upright members 30 and 32. The members 30 and 32 are hinged to the platform 4 at pivot pins 34 and fold flat to the platform 4 as shown at FIG. 2. The upper end of the members 30 and 32 include transverse wings or seat arms 38 and 40 and the ends of the arms 38 and 40 are coupled to abut one another and pivot at a hinge 42. The seat arms 38 and 40 can accept a rigid, padded seat, for example having a wood platform and a cloth-covered foam cushion. A suitable flange or a latch coupler can attach to the arms 38 and 40 to restrict folding. Presently, a sling seat 8 is preferred and the arms 38 and 40 mount in sleeves 44 formed into the seat 8.

Separately extending from the upright 6 is a truss seat support assembly 46 that includes wings or extensions 48 formed as notches in end pieces 50 and 52. The end pieces 50 and 52 are coupled to a pivot 54. Sleeves or loops 56 at the forward edge of the seat 8 mount to the extensions 48. The pivot 54 allows the side pieces 47 and end pieces 50 and 52 of the assembly 46 to fold along with the members 30, 32, 38 and 40 when the platform 4 is folded, see FIG. 3. The hinges 22, 24, 42 and 54 also align along a common longitudinal axis such that, upon folding the upright seat support 6 flat to the platform 4, both the platform assembly 4 and upright seat support assembly 6 fold in half as shown in FIG. 3.

The seat 8 is normally removed and stored when the stand 2 is folded for transport. Latches can be used at the seat support assembly 6 and/or truss assembly 46 to prevent over-rotation of the hinges 42 and 54, although the sling seat 8 serves the same end when the user is seated. The hinges 42 and 54 include flanges or stop surfaces that prevent over-rotation past 90°.

The stand 2 thus provides an assembly having a collapsing platform 4 that can open to a width in the range of 36 to 46-inches, yet fold for transport to a width of 18 to 23-inches and not extend past the shoulders. The opened stand 2 is further stabilized by the latch 26 and the multiple flanged stops at the hinges 22, 24, 42 and 54 to provide a rigid and stable platform 4 for working loads capable of supporting the typical user. Additional cross supports and accessories may also be attached to the platform 4 in fashions discussed below with respect to still other collapsing tree stand constructions of the invention. Suitable handle and/or back straps 58 can be secured to the platform 6 to facilitate transport.

Figure 4:
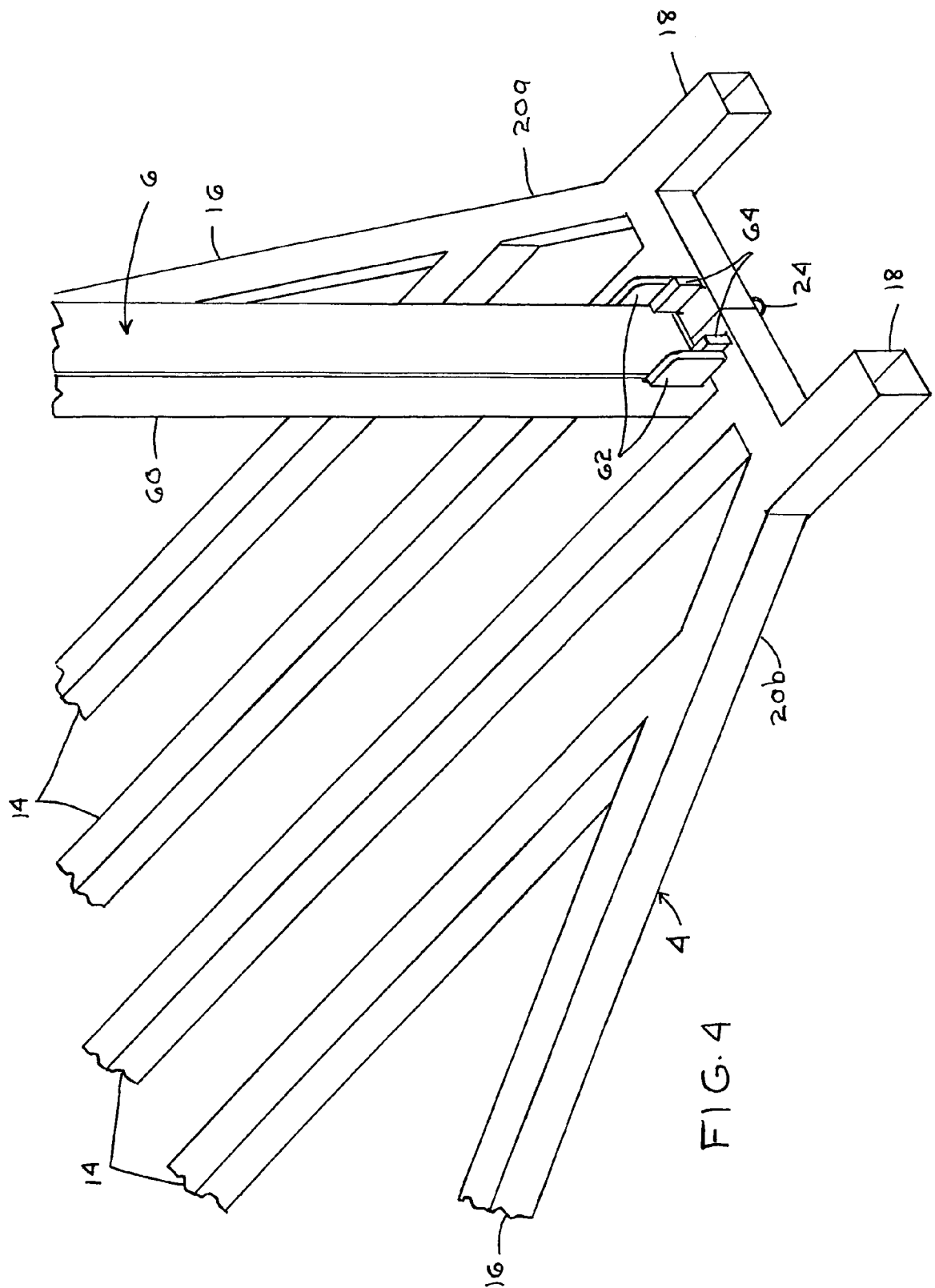
FIG. 4 is a detailed, partial perspective view to the platform of FIG. 1 and the folding joint with a single folding seat support member.

In lieu of an upright seat support assembly 6 having a pair of members 30 and 32, a single seat support upright 60 can be secured to the platform 4 as shown in FIG. 4. The upright 60 is coupled to the platform 4 with a single pivot fastener 34. The upright 60 is thus able to fold flat to the platform sections 20a and 20b and the sections 20a and 20b can fold in half at the pivots 22 and 24 as shown in FIG. 3.

The pivot joint is stabilized with flanges 62 that extend from the upright support 60 and interlock with projections 64 at the platform sections 20a and 20b to rigidly fix the upright 60 in a vertical condition when folded open. The cooperating flanges 62 and projections 64 compensate for the single pivot 34. A truss, seat support assembly 46 with suitable wings to contain a sling seat 8 or a pedestal or platform seat having a pinned, tubular coupler that telescopes with the upright 60, see FIG. 6, can be fitted to the upright 60. Otherwise the cables 10 attach in fixed or adjustable lengths between the platform 4 and upright 60.

Figure 5:
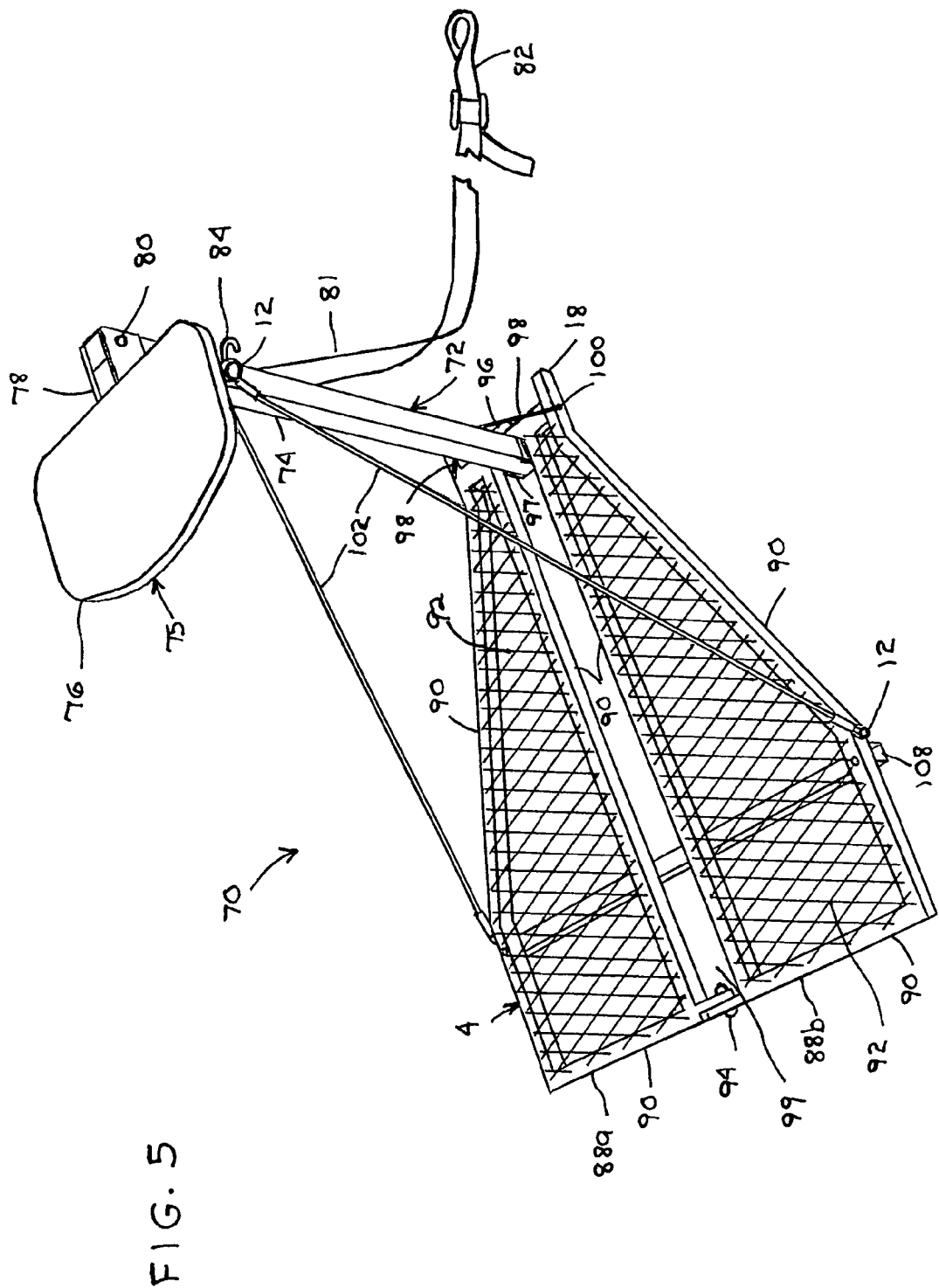
FIG. 5 is a perspective view of a tree stand with a two-section, bi-fold platform and a single, hinged seat support shown in an open condition.

Referring to FIG. 5, a perspective drawing is shown to another multi-section, collapsing tree stand assembly 70 that is constructed with a single upright seat support assembly 72. Attached to the top of an upright support member 74 is a folding, platform seat assembly 75 having a padded seat 76, see also FIG. 6. A support arm 78 extends beneath the seat 76 and is secured to the upright 74 with a pivot fastener 80. The stand 70 is secured to a tree with a length adjustable strap 81. A loop or ring 82 secured to the end of the strap 3 mates with a hook 84 mounted to the upright 74. A rope, chain, seat belt assembly or other interlocking and length adjustable fastener assemblies can be used in lieu of or with the strap 81.

A platform assembly 4 constructed of sections 88a and 88b is secured to the vertical seat support assembly 72. The sections 88a and 88b are formed from a framework of frame members 90 that define a desired perimeter shape. Metal mesh pieces 92 are secured to the members 90 to define a porous, rigid foot support surface. The sections 88a and 88b are secured to pivot relative to each other at longitudinal pivots 94 and 96.

The lower end of the upright support 74 is secured to a pivot bracket 97 attached to one of the sections 88a and 88b. Suitably shaped pivot arms 98 rotate at pivots 100 at the platform 86 and separately support the upright 74 to the platform 86. The arms 98 can comprise rigidly formed members or cables.

Figure 6:
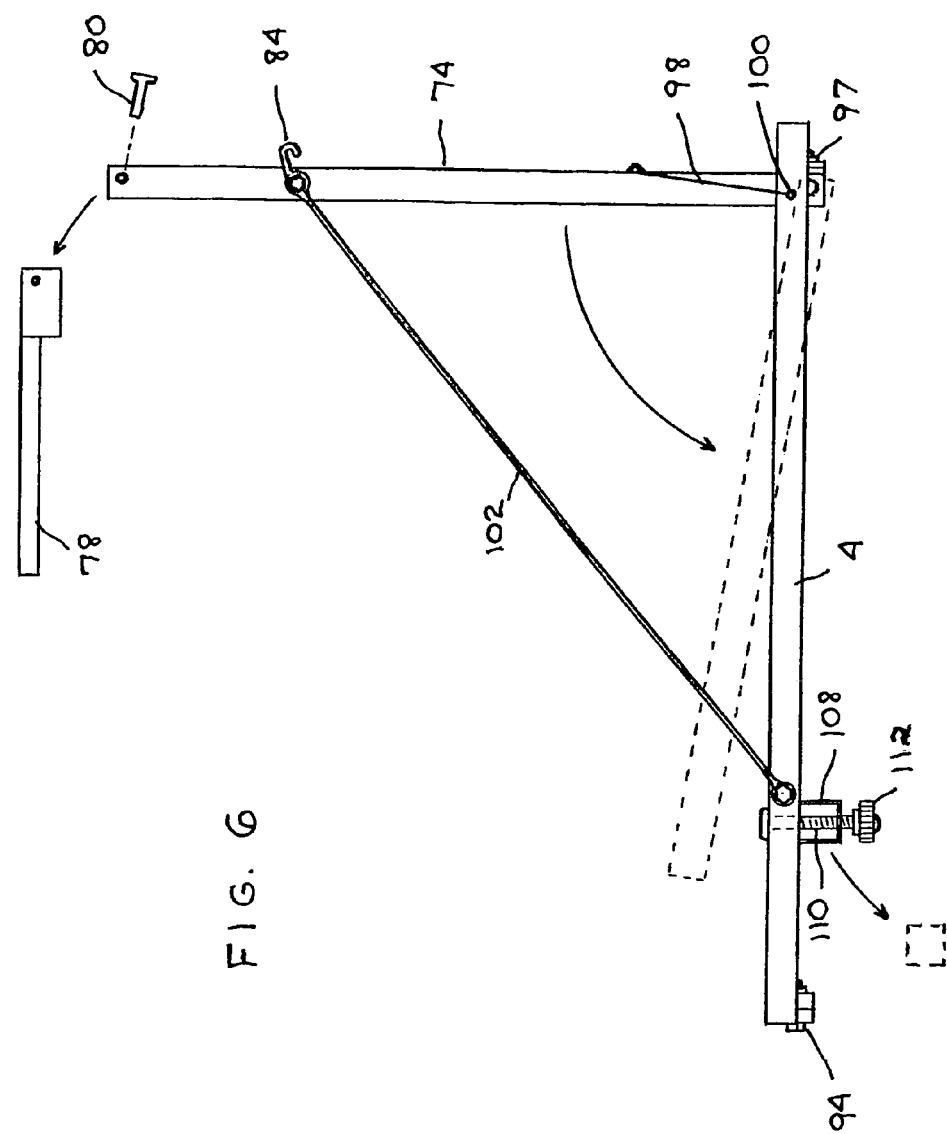
FIG. 6 is a side view of the stand of FIG. 5 showing the platform in dashed line partially folded and a rigid seat removed.
Figure 7:
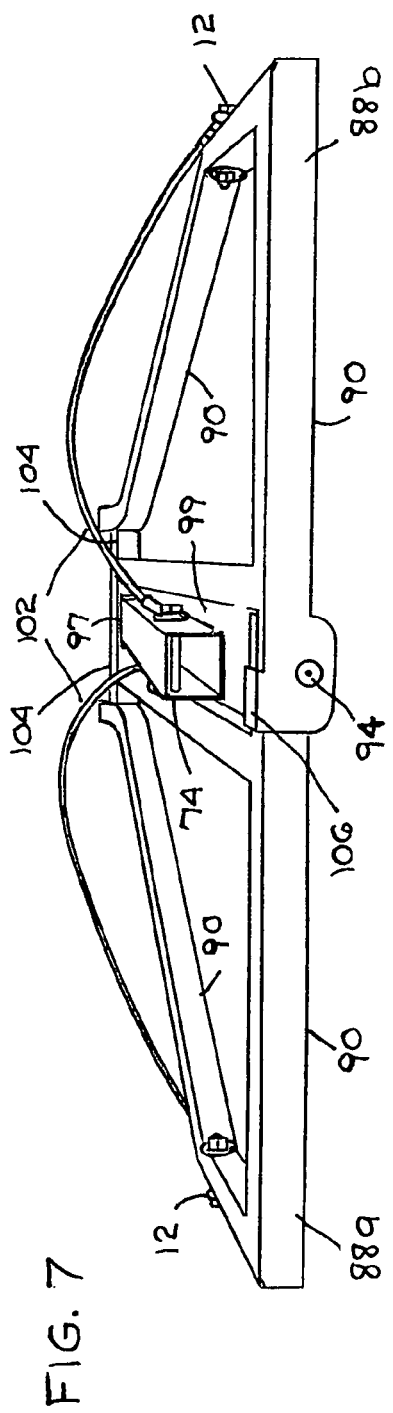
FIG. 7 is a front perspective view of the tree stand platform of FIG. 5 without the mesh decking and showing the seat support upright partially folded down.
Figure 8:
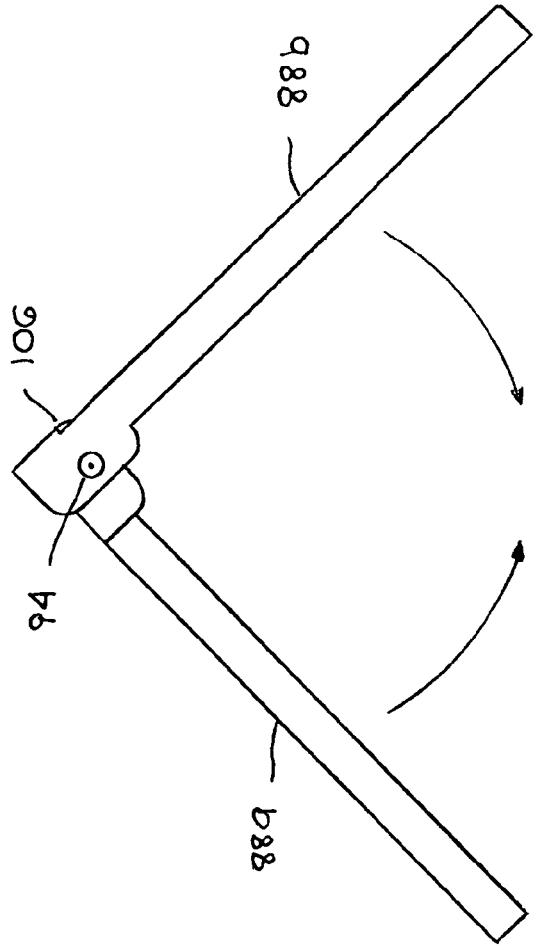
FIG. 8 is a front view of the tree stand platform of FIG. 5 showing the platform folding direction and with the platform in a partially folded condition.

The pivots 97 and 100 permit the upright 74 to fold flat to the platform 4, see FIGS. 6 and 7. The platform sections 88a and 88b, in turn, fold at the pivots 94 and 96, see FIGS. 8 and 9, to define a relatively compact assembly that is easily transported without the attendant problems mentioned above. Cables 102 that are secured with suitable fasteners 12 (e.b. bolt/nuts, eye bolts, rivets) to extend between the upright support 74 and the sides of the platform sections 88a and 88b separately limit the relative rotation of the upright assembly 72 and platform assembly 4.

Figure 9:
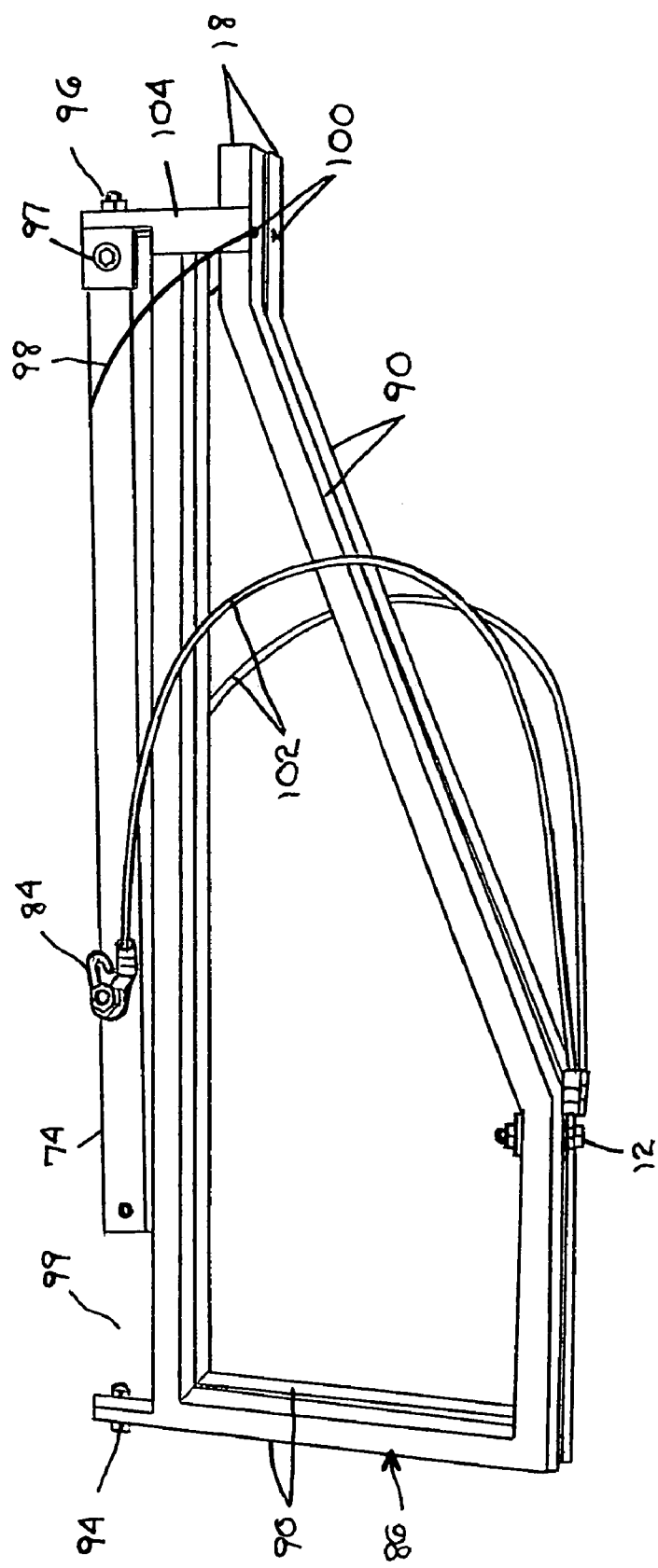
FIG. 9 is a perspective view showing the tree stand of FIG. 5 without the mesh decking and with the platform and seat support upright folded together for transport.

FIG. 9 is shown without the meshwork 92 and wherefrom the folded alignment of the upright support 74 to the sections 88a and 88b and to an interior frame space 99 are more apparent. Also more apparent is the manner of the mounting of the pivot bracket 97 to cross pieces 104 that contain the pivot 96.

FIG. 7 also depicts a flange 106 that is adapted into each of the pivots 94 and 96. The flanges 106 overlie the frame members 90 at the joint between the sections 88a and 88b to prevent over-rotation of the sections 88a and 88b.

Figure 10:
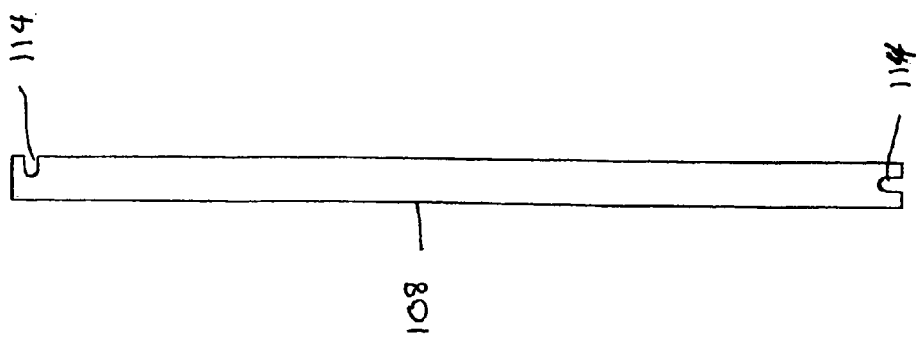
FIG. 10 is a plan view of the crossbeam support for the tree stand of FIG. 5.

The sections 88a and 88b are further stabilized with a detachable crossbeam 108, which is also shown at FIG. 10. The crossbeam 108 is secured to the platform 4 at threaded fasteners 110 that align with notches 114 in the crossbeam 108. Upon tightening hand nuts 112, the crossbeam 108 strengthens and secures the platform 4 against collapse from the weight of a user standing on the platform assembly 4.

Another multi-section, folding platform assembly 4 is shown at FIGS. 11 and 12. In this construction, the platform sections 120a and 120b include interior frame pieces 14 bounded by the perimeter pieces 90. The platform sections 120a and 120b are connected at three pivot hinges 94, 95 and 96. The ends 122 of the adjoining frame pieces 14 at the pivots 94, 95 and 96 abut each other when the platform 4 is folded closed and prevent over-rotation of the platform sections 120a and 120b. The sections 120a and 120b are normally covered with an expanded mesh or other suitable solid or porous cover material.

FIG. 13 shows another collapsing tree stand assembly 130, with the seat assembly 75 removed, that has a folding, platform assembly 4 defined by perimeter frame pieces 90 that form two folding sections 88a and 88b. A hinge arm 132 extends between forward ends of the platform sections 88a and 88b. A pivot bracket 97 and pivot fastener 34 support an upright seat support member 74 that extends between aft ends of the platform sections 88a and 88b. Pivot joints 134 are provided at the ends of the arm 132 and bracket 97 to permit the platform sections 88a and 88b to fold inward as shown in FIG. 14, as the upright support member 74 is folded into parallel alignment to the platform sections 88a and 88b.

Figure 15:
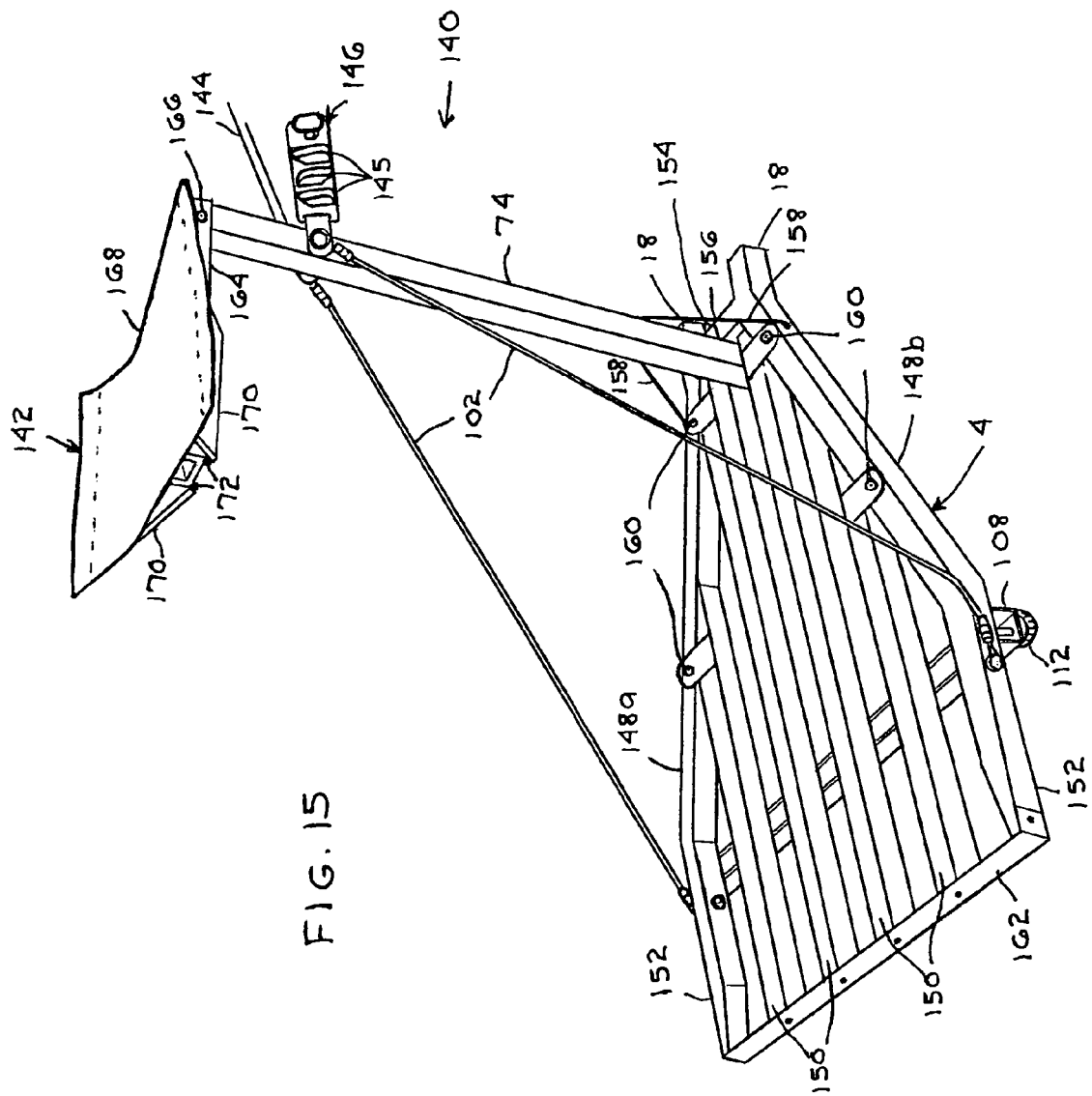
FIG. 15 is a perspective view of a tree stand having a two-section platform, a single upright seat support, fan-folding platform frame and a crossbeam support shown in an open condition.

FIG. 15 shows yet another tree stand assembly 140 having a single upright seat support 74. A sling-type, folding seat assembly 142 pivots from the end of the upright support 74. A rope strap 144 is secured to the upright support 74 and connects to a cinch buckle or plate 146, see FIG. 20, to secure the tree stand assembly 140 to a tree. Once a desired length of the rope 144 is wrapped around a tree, the loose end is wound between displaced ribs 145 and peg 178 at the plate 146 to secure the stand 140 to the tree.

A folding, support platform assembly 4 having sections 148a and 148b is constructed from a number of interior frame members 150 that extend from border or perimeter members 152. Arms 154 at the aft ends of the perimeter members 152 are coupled together at a pivot hinge 156 in a fashion that allows the platform assembly 4 to fold in half along a longitudinal platform axis. The upright support 74 is separately coupled to a bracket 97 and the pivot hinge 156 to allow the upright support 74 to fold into parallel alignment with the folded platform assembly 4, see FIG. 16.

Support cables 102 depend between the perimeter members 152 and the upright support 74. Optional rear support cables 158 are trained between the lower end of the upright support 74 and the perimeter members 152.

The interior platform members 150 are separately connected to the perimeter members 152 at pivot joints 160. The interior and perimeter frame members 150 and 152 are supported and braced at the bottom of the platform 86 with a detachable crossbeam member 108 and threaded hand nuts 112. A strap 162 is secured to the forward end of each of the interior and perimeter frame members 150 and 152 and holds the members 150 and 152 in parallel alignment to each other when the platform assembly 86 is splayed to the depicted open condition.

Figure 16:
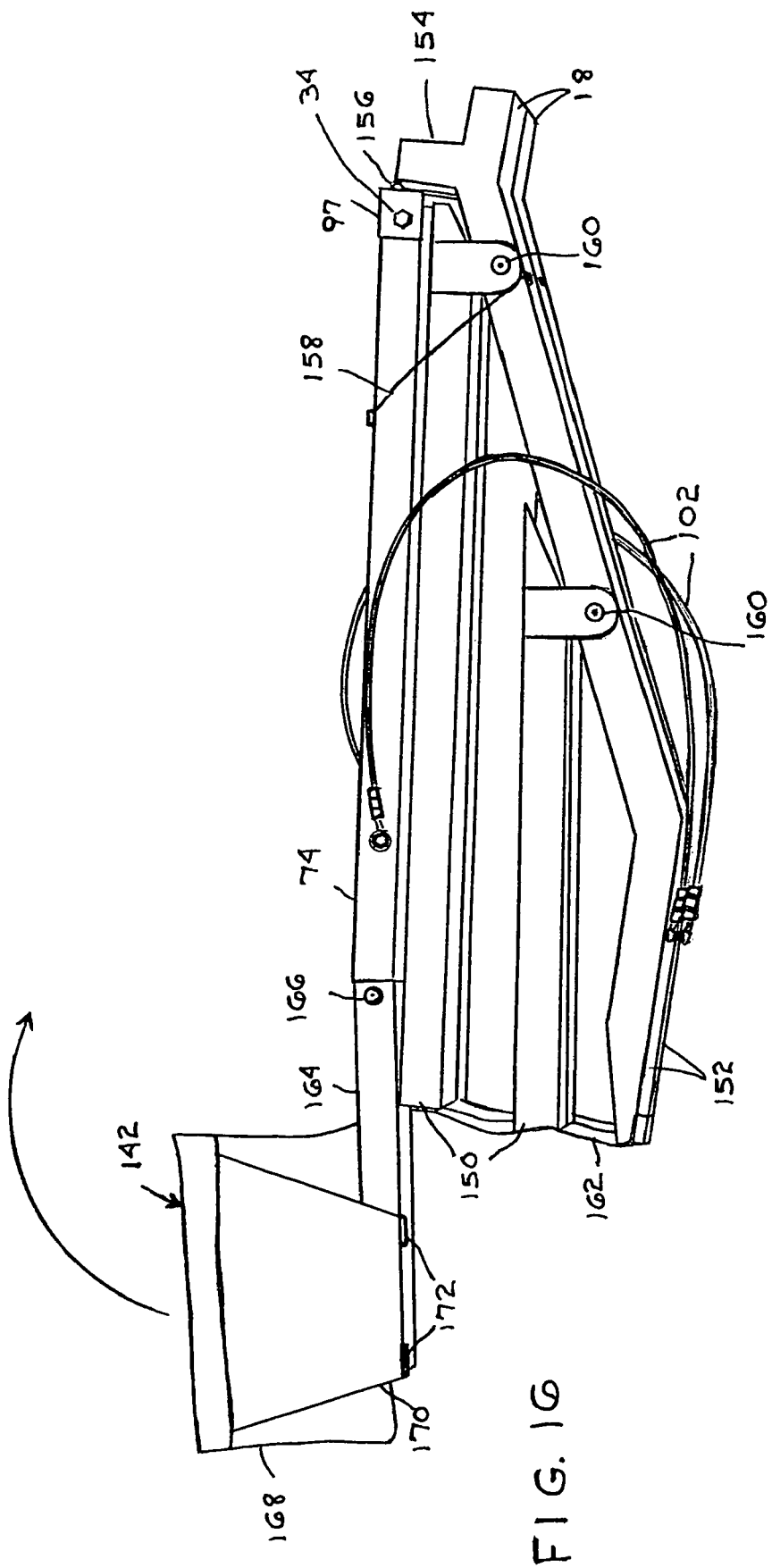
FIG. 16 is a side perspective view of the tree stand of FIG. 15 shown in a collapsed condition with the seat and seat support folded open and the strap rope and cleat buckle removed.
Figure 17:
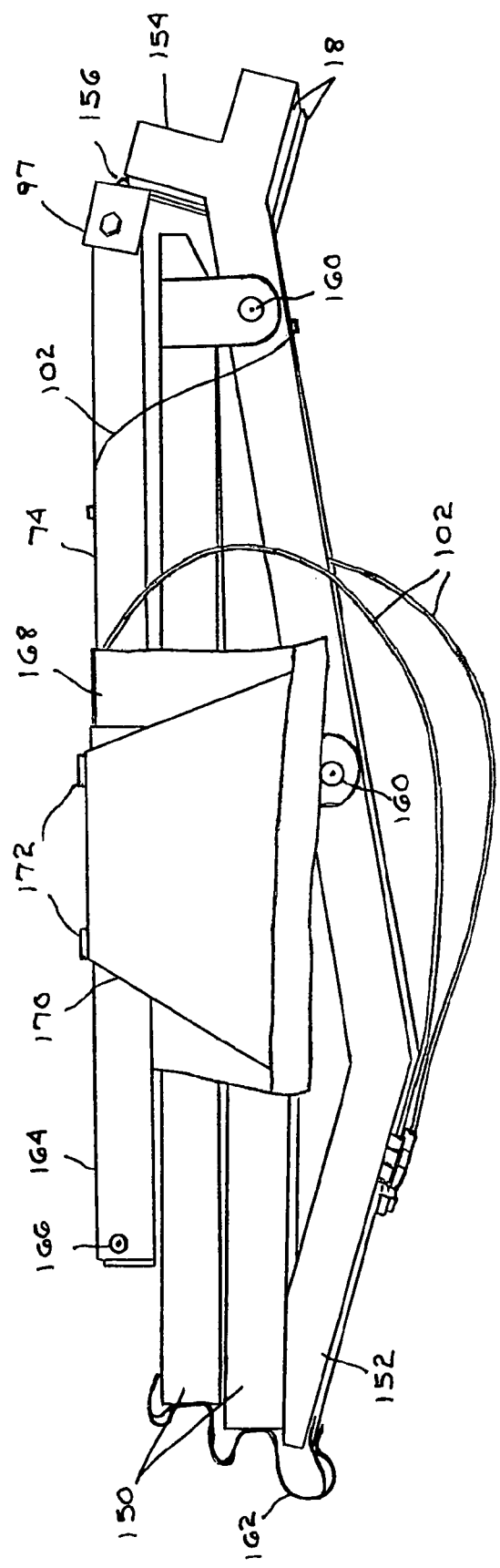
FIG. 17 is a side perspective view of the tree stand of FIG. 15 shown in a collapsed condition with the seat and seat support upright folded closed and the platform frame members fan-folded together adjacent the folded seat and with the rope and cleat buckle removed.
Figure 18:
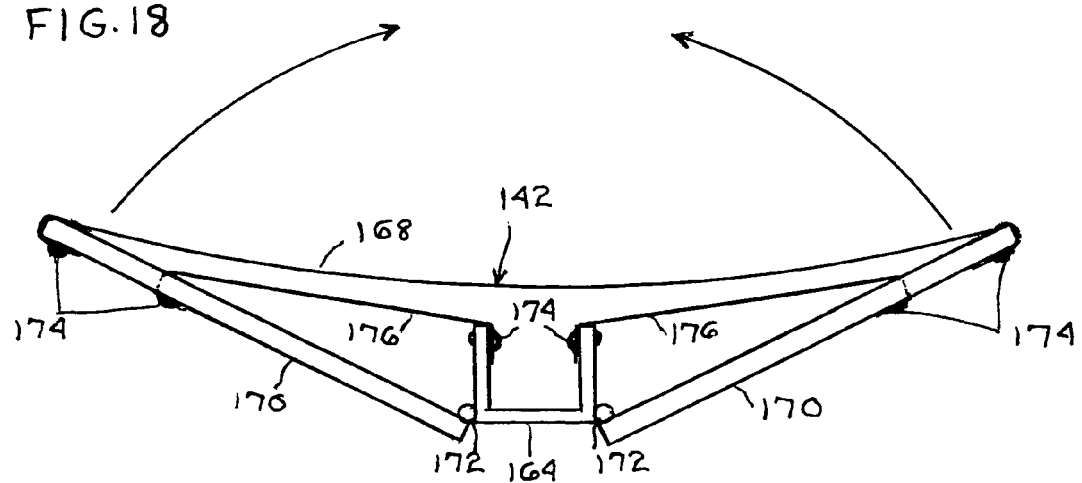
FIG. 18 is a plan view of the seat of the tree stand of FIG. 15 shown in an open condition.
Figure 19:
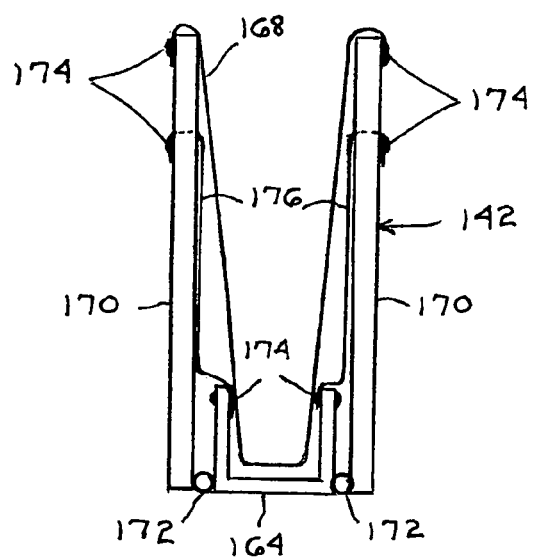
FIG. 19 is a plan view of the seat of FIG. 18 shown in the folded condition.

The tree stand assembly 140 collapses or folds for transport in the following fashion and as shown in FIGS. 16 and 17. The crossbeam 108 is first removed. The upright support 74 is next folded forward and down. The perimeter members 152 and interior frame members 150 are fan folded inward at pivot joints 160 toward the upright support 74 in the fashion shown in FIG. 17 to collapse the assembly 140 to a width less than half the width of the platform 86. The interior and perimeter frame members 150 and 152 are then pivoted at a longitudinal pivot 156 between the arms 154 to fold the platform assembly 86 in half.

As the platform assembly 4 is collapsed, the seat assembly 142 is rotated back on itself to align with the upright support 74, see FIGS. 16-19. That is, a transverse support arm 164, formed from a length of channel stock, is rotated about pivot 166 at the upright support 74. A fabric, sling seat 168 rotates with the arm 164 and folds around the upright 74 and nests within the channel. Folding, lateral seat supports 170 splay the edges of the seat 168 away from the arm 164. The lateral supports 170 are hinged to the arm 164 at pivots 172. The edges of the seat 168 are attached to the supports 170 with suitable fasteners 174. Cable supports 176 can also extend between the arm 164 and the lateral supports 170 beneath the seat 168 to stabilize the supports 170.

Figure 20:
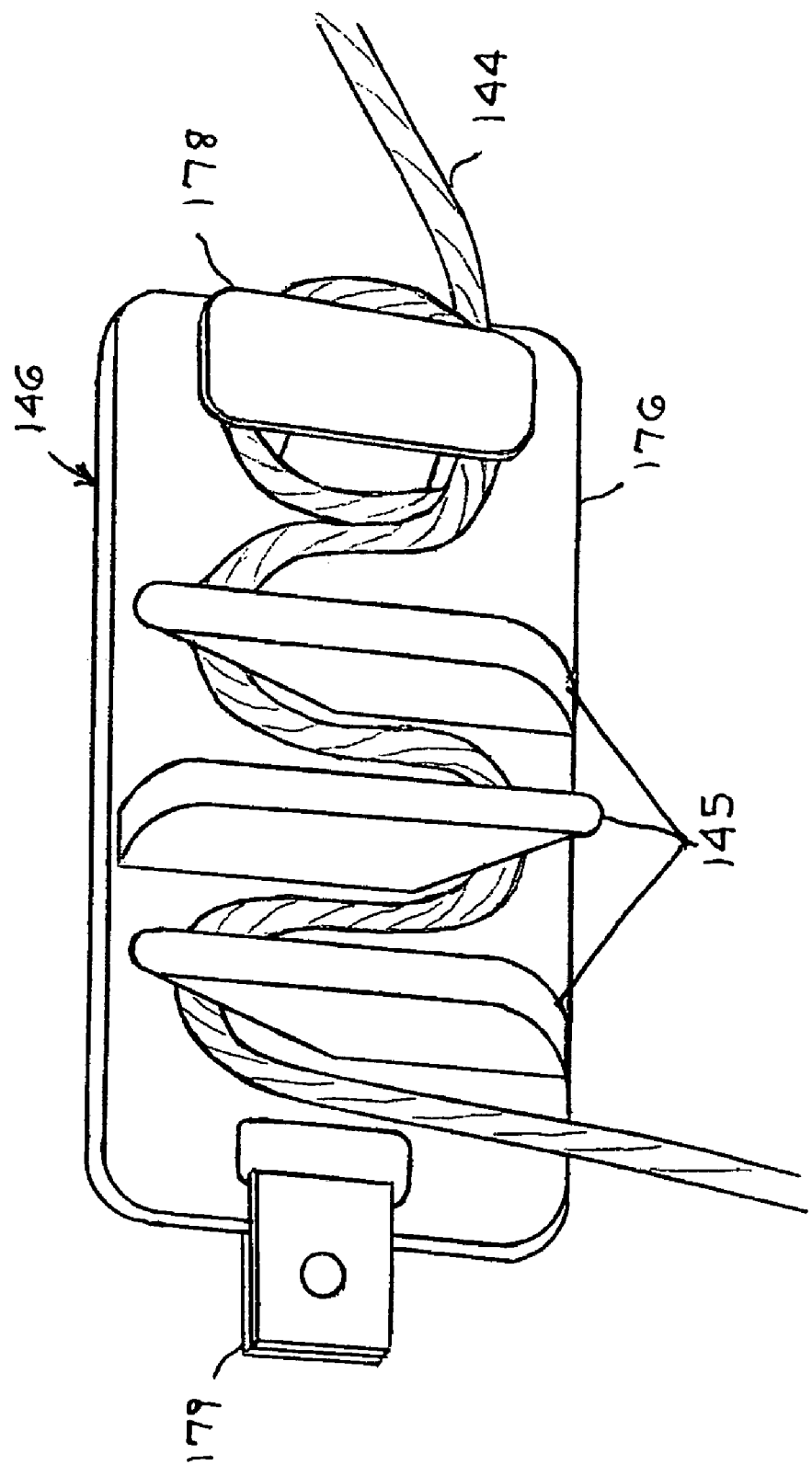
FIG. 20 is a perspective view of the rope strap cleat buckle.

A detailed view of the cinch buckle or plate 146 is shown at FIG. 20. The cinch buckle 146 provides a main body 176, ribs or cleats 145 and a peg 178. The rope 144 is secured with a combination of weavings of the rope 144 through the cleats 145 and a wrap at the peg 178. A bored clip or other suitable fastener 179 is used to secure the plate 146 to the upright 74.

Figure 21:
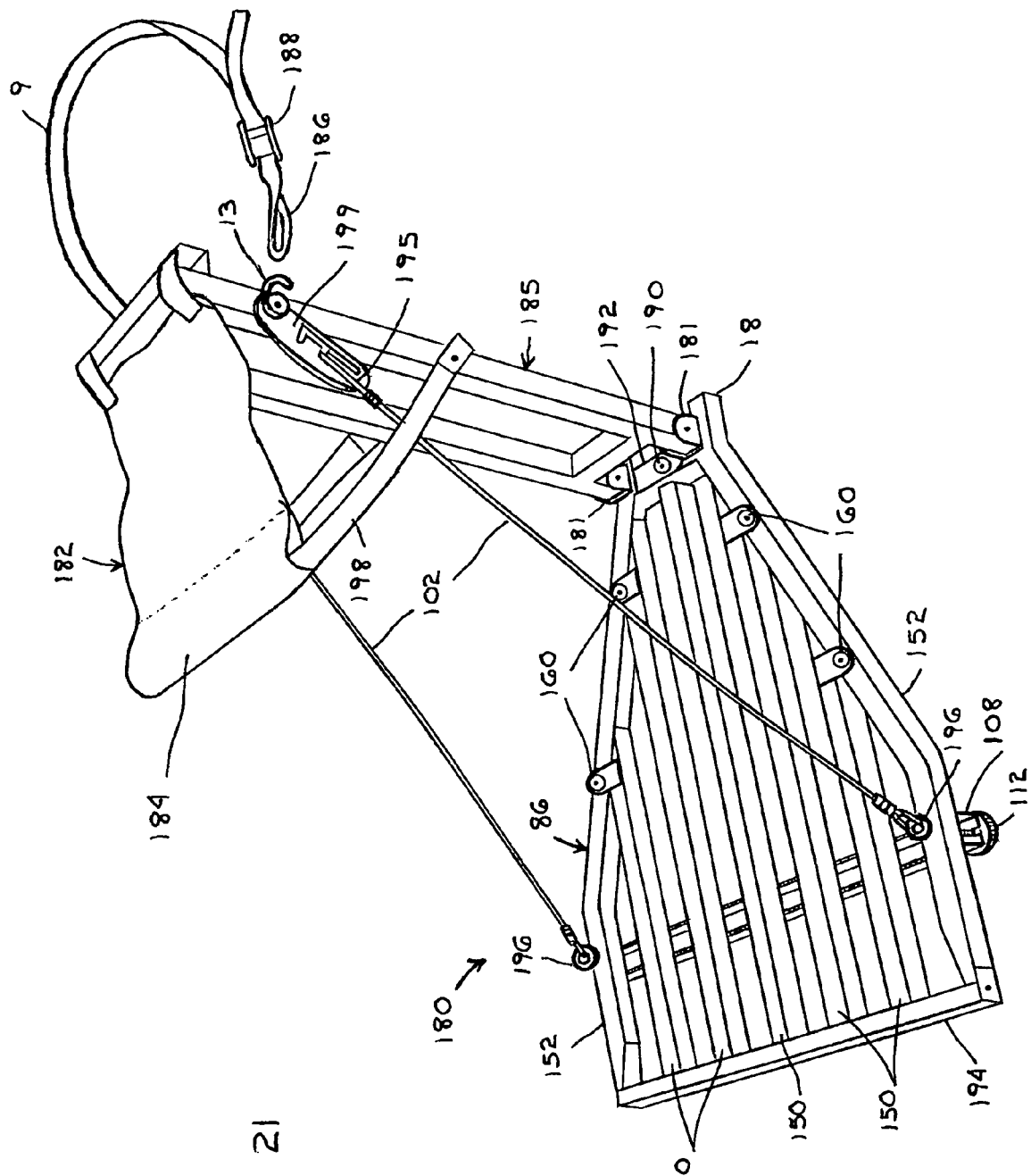
FIG. 21 is a perspective view of a collapsing tree stand having a single-section, latched, center-pivot, fan-folding platform, a multi-upright seat support, folding sling seat and a crossbeam support shown in an open condition.

Referring to FIG. 21, a perspective drawing is shown to another collapsing tree stand 180. The stand 180 provides a multi-upright, folding seat support assembly 182, a folding, sling seat 184 and a length adjustable strap 9. An upright seat support assembly 185 is secured to pivot relative to a support platform 86 at pivot brackets 181. A loop 186 in the strap 9, defined by a length adjuster 188 (e.g. a ladder buckle), attaches to a hook 13.

Figure 22:
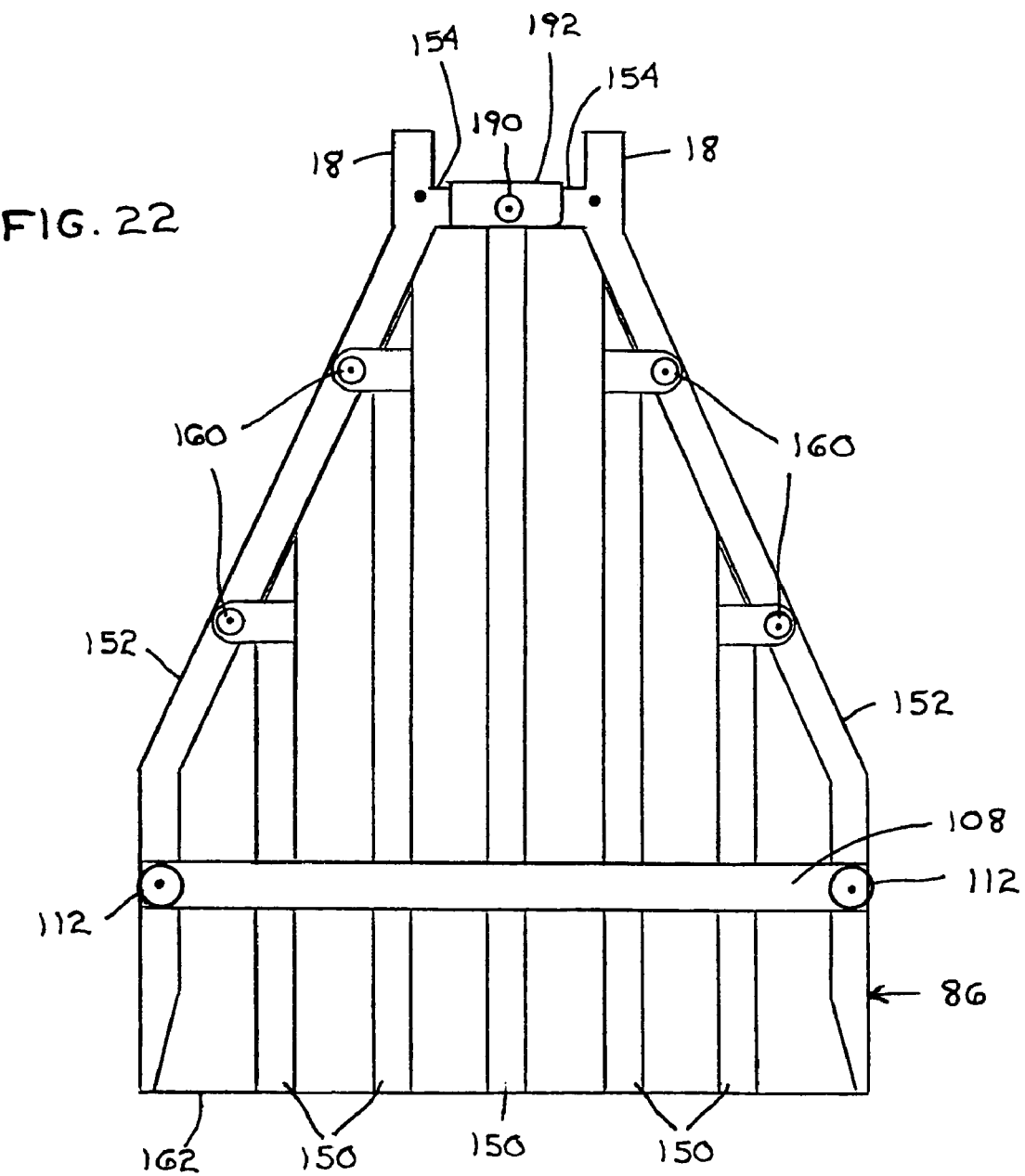
FIG. 22 is a bottom view of the tree stand platform of FIG. 21 shown in the open condition.
Figure 23:
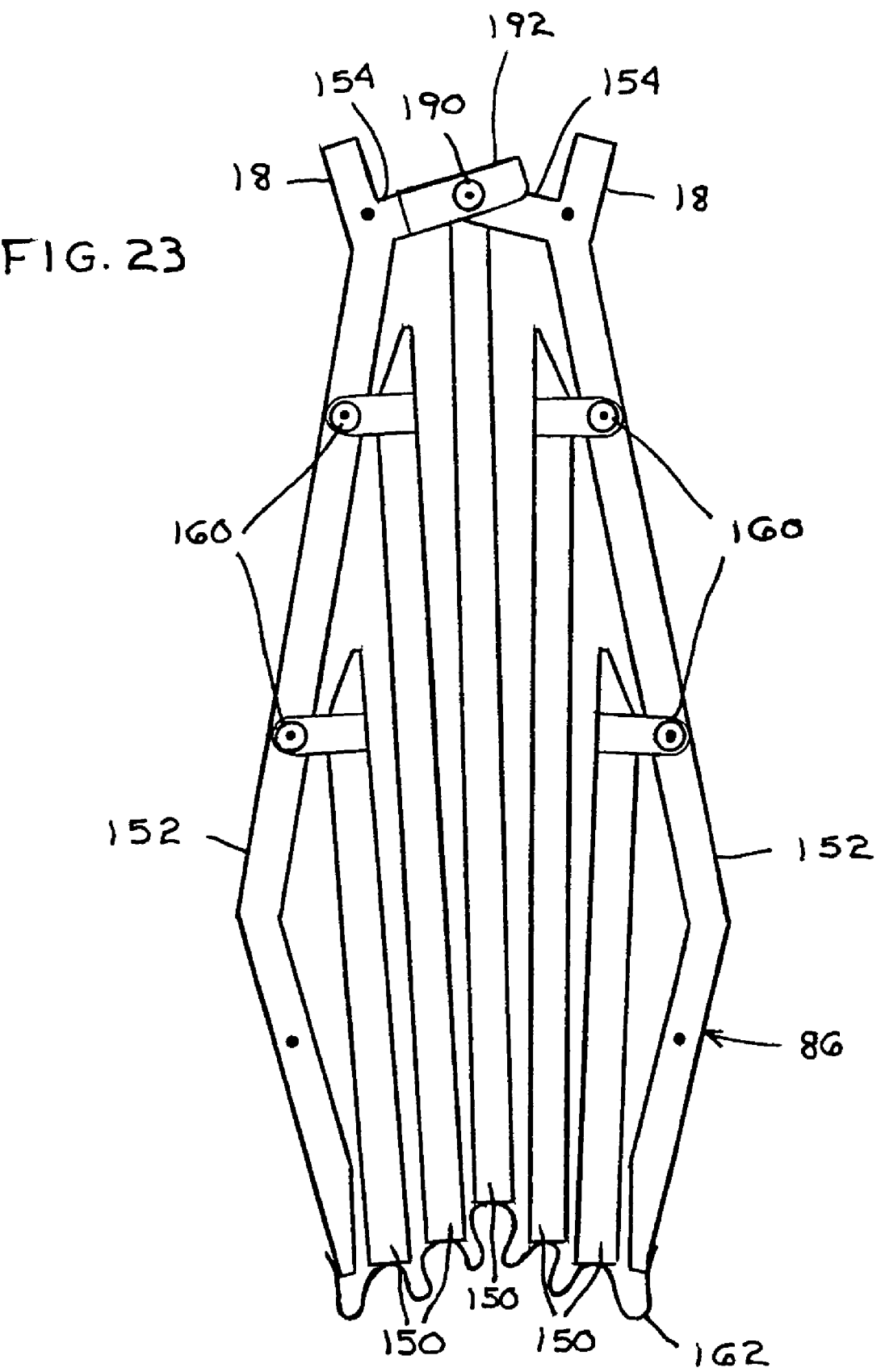
FIG. 23 is a bottom view of the tree stand platform of FIG. 21 in the folded condition with frame member end straps exposed.

A fan-folding platform assembly 86, shown also in plan view at FIGS. 22 and 23, provides for perimeter members 152 and several interior frame members 150. Several of the interior frame members 150 are secured at pivot joints 160 to the perimeter members 150. A center interior frame member 150 is connected to a pivot joint 190 at transverse frame arms 154 and an overlapping channel-shaped latch plate 192.

The pivot joints 160 and 190 permit the members 150 to fan-fold toward and away from each other in the plane of the platform 86. The platform assembly 86 does not fold longitudinally. When the platform 86 is splayed to an open condition, see FIGS. 21 and 22, the latch plate 192 overlaps the frame arms 154 to prevent the collapse of the platform 86. The folded, transport condition is shown at FIG. 23 and wherein the operation of the overlapping latch plate 192 is more apparent.

An end strap 162 attached to each of the ends of the frame and perimeter members 150 and 152 limits the displacement of the members 150 and 152 from each other. A rigid, channel-shaped end cap 194 can also be secured over the ends of the frame members 150 and 152, see FIG. 21. Various other straps 162 and rigid end caps 194 of other shapes might also be used to restrain the frame members 150 and 152. If an end cap 194 is used, movement of each frame member 150 is desirably restricted with a resilient detent pin or projections that telescope from the interior channel of the end cap 192 and mount in or to the sides of the ends of the members 150 to prevent lateral movement.

Support cables 102, eyebolts 196, a crossbeam support 108, and hand knobs 112 support and stabilize the platform members 150. The platform assembly 86 is folded by loosening the hand knobs 112 and removing the crossbeam 108 and end cap 194, if provided. The platform members 150 are then folded inward, see FIG. 22. The upright seat support 182, folding truss arm 198 and sling seat 184, in turn, are rotated to lie against the collapsed platform 86. The stand assembly 180 can then be transported with the aid of a hand carry strap or back straps 158 fitted to the platform 86.

Figure 24:
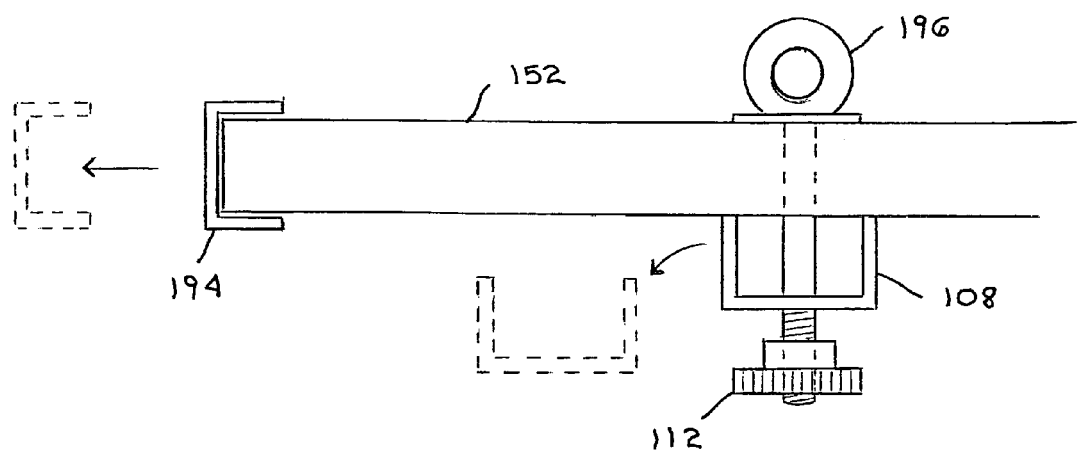
FIG. 24 is a fragmentary side view showing an end cap piece of the platform of FIG. 21.
Figure 25:
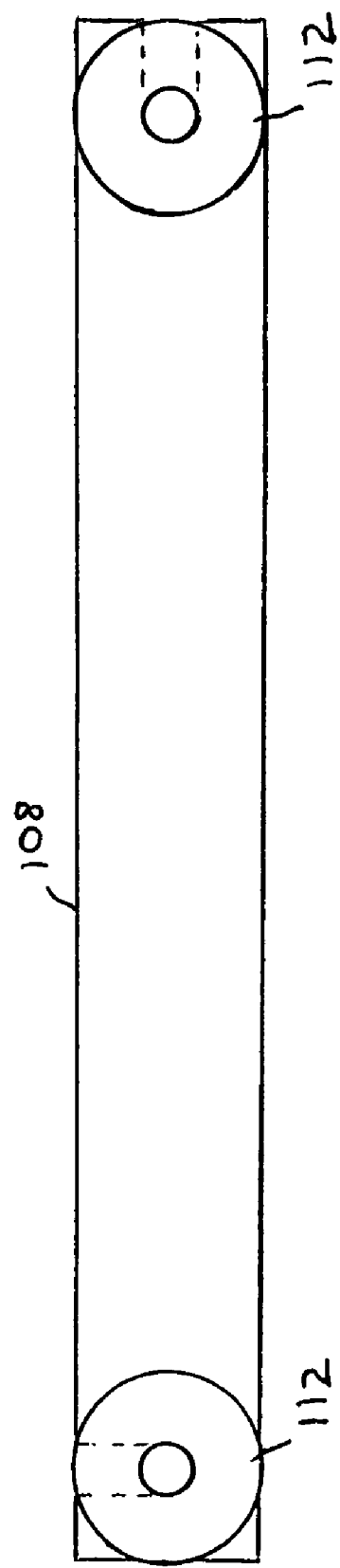
FIG. 25 is a bottom view of the crossbeam support of the tree stand of FIG. 21.
Figure 26:
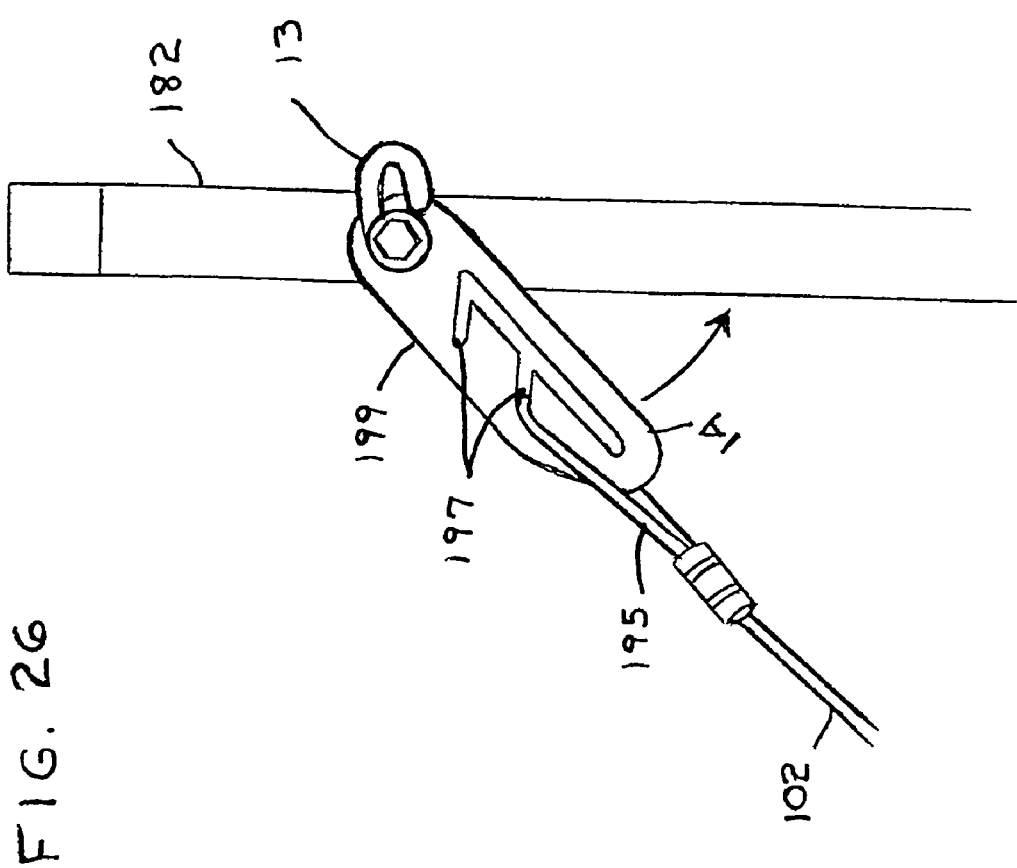
FIG. 26 is a side view of a pivoting, cable length adjuster bracket used at the tree stand of FIG. 21.

FIGS. 24 and 25 depict additional detailed views to the construction and mounting of the crossbeam 108 and end cap 194. FIG. 26 depicts a detailed view to cable length adjusters 199 that mount to the upright 182 and retain a looped end 195 of each cable 102 at a selected one of several displaced notches 197. The length of the cables 102 and relative angular displacement between the upright 185 and platform 86 can thereby be adjusted to accommodate the lean angle of a support tree. It is to be appreciated a variety of alternative types of length adjusters 199 can be applied to compensate for the lean angle of a tree and vary the cable length to assure that the platform 86 lies parallel to the ground.

Figure 27:
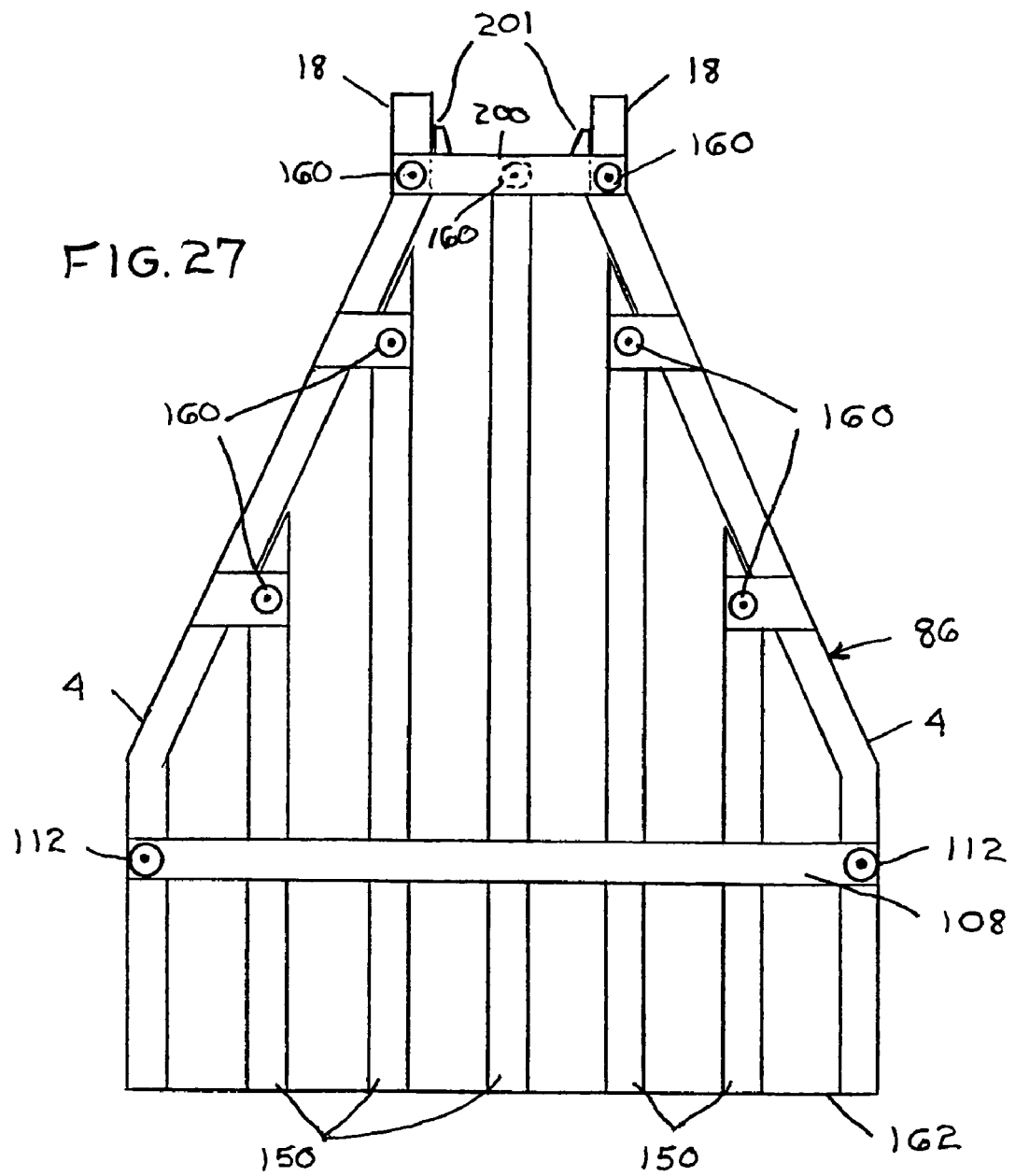
FIG. 27 is a bottom view of a dual pivot, fan-folding tree stand platform having a crossbeam support shown in an open condition.
Figure 28:
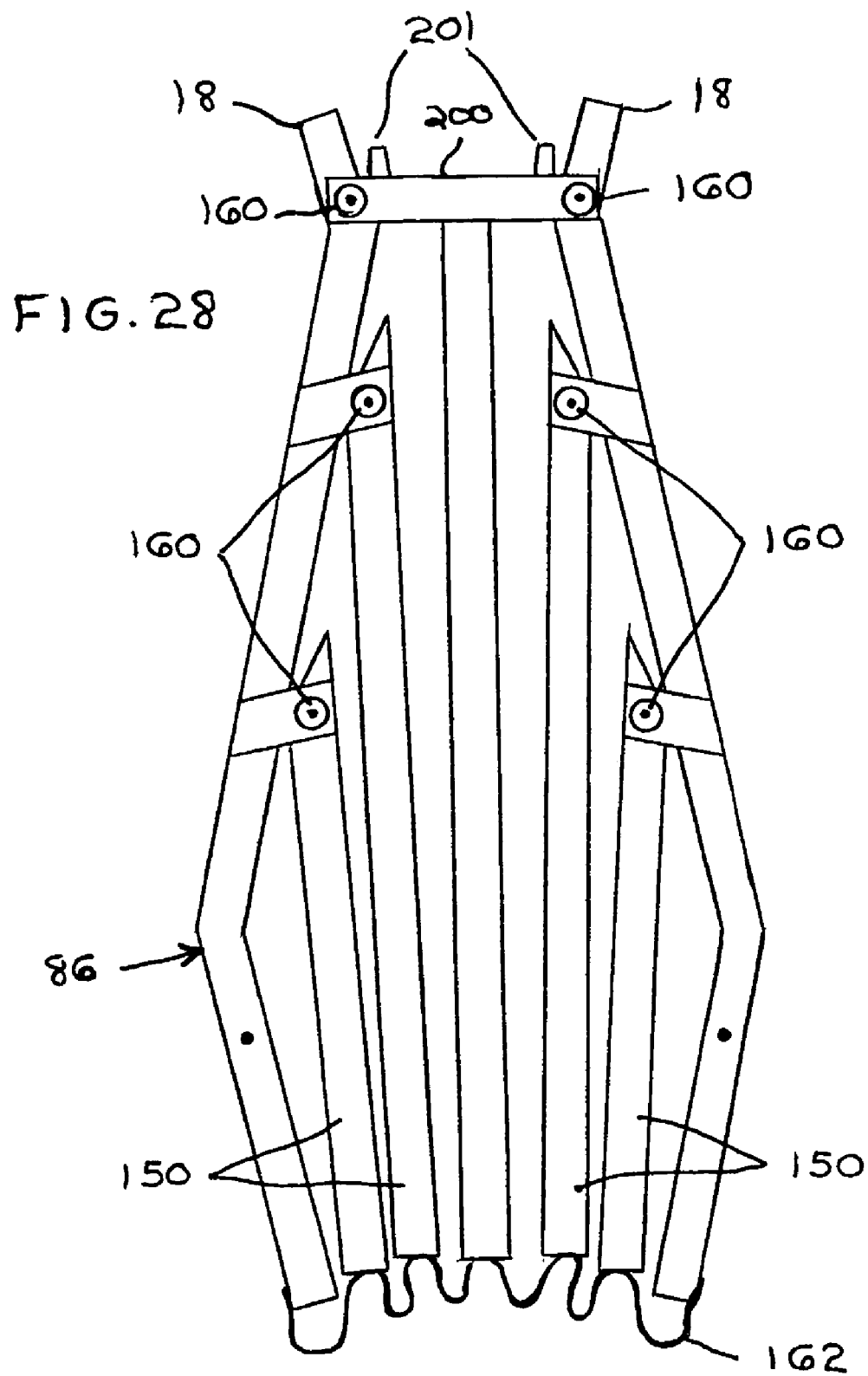
FIG. 28 is a bottom view of the dual pivot tree stand platform of FIG. 27 shown in the folded condition with frame member end straps exposed.

FIGS. 27 and 28, in turn, show bottom views of open and closed conditions to another multi-pivot, fan-fold tree stand platform assembly 86 having a crossbeam support 108. The principal difference versus the platform assembly 86 at the stand 180 is that a single cross member 200 spans between the aft ends of the perimeter members 152. The member 200 is secured with pivot joints 160 to the perimeter members 152 and the center frame member 150. Upon detaching the crossbeam 108 from the platform assembly 86, the frame members 150 and 152 can be fan-folded together to narrow the platform width for transport. A pivot 160 (shown in dashed line) might also be included between the center frame member 150 and the cross member 200. Extending from the cross member are a pair of additional grippers 201 to facilitate the gripping of a tree.

Figure 29:
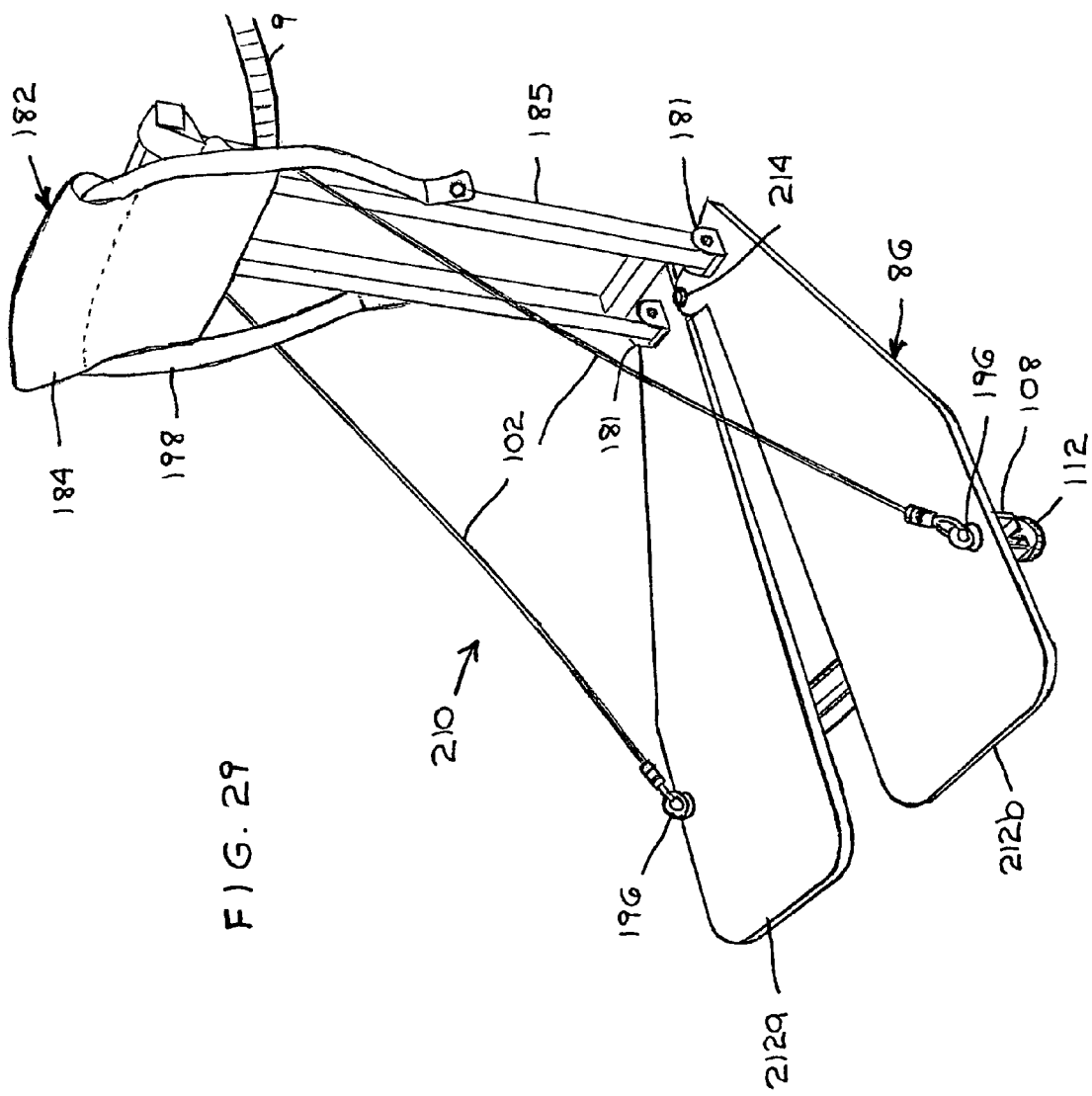
FIG. 29 is a perspective view of a folding tree stand having two overlapping, fan folding platform sections, center pivot, a multi-upright seat support assembly and a truss-mounted sling seat shown in an open condition.

FIG. 29 depicts yet another collapsing tree stand assembly 210. The stand 210 provides a multi-upright seat Support assembly 185, folding seat assembly 182, sling seat 184 and a length adjustable strap 9. The upright assembly 185 is secured to pivot relative to a fan-fold support platform 86 at pivot brackets 181. A crossbeam 108 mounts beneath the platform assembly 86.

Figure 30:
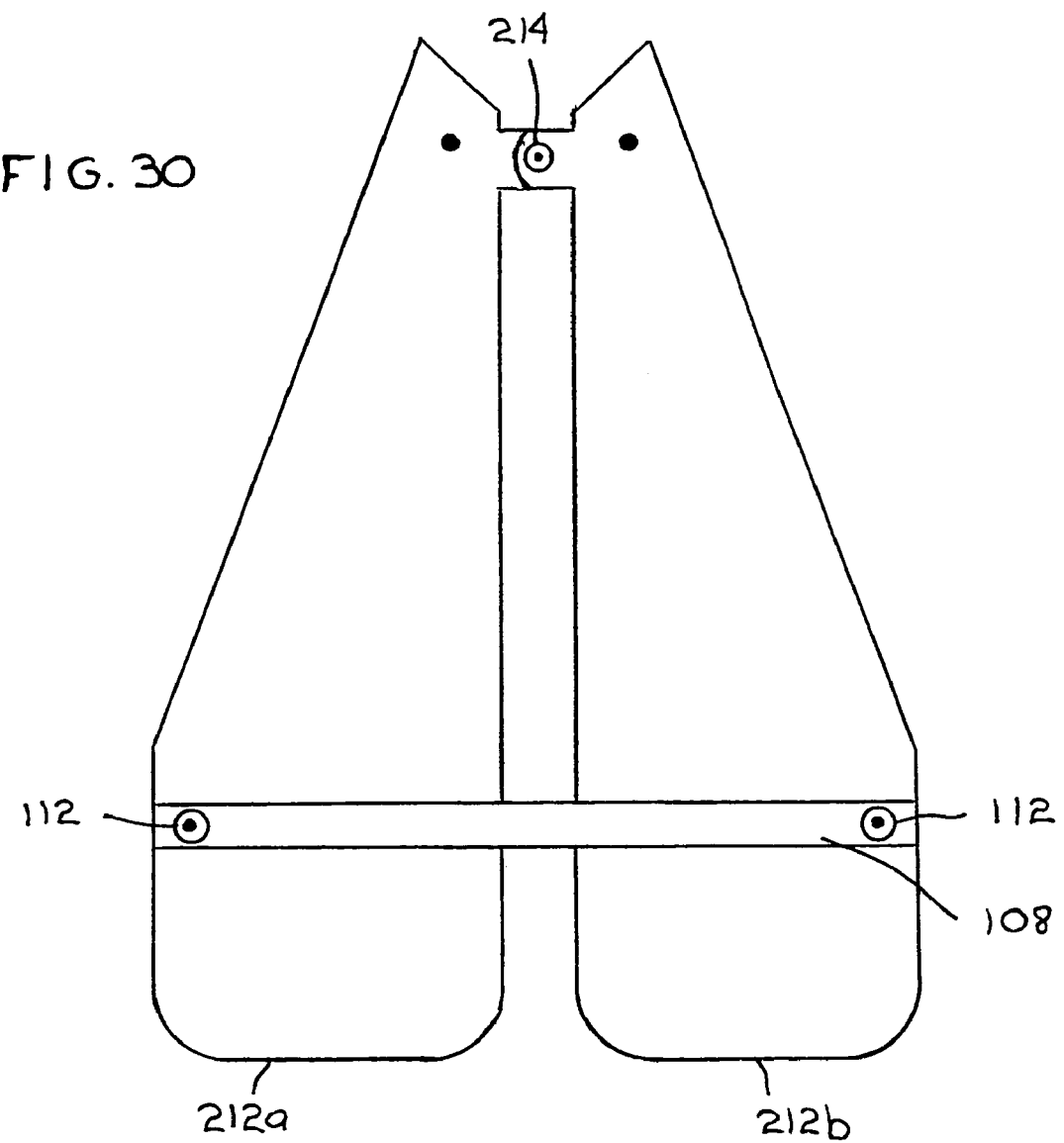
FIG. 30 is a bottom view of the tree stand platform of FIG. 29 shown in the open condition.
Figure 31:
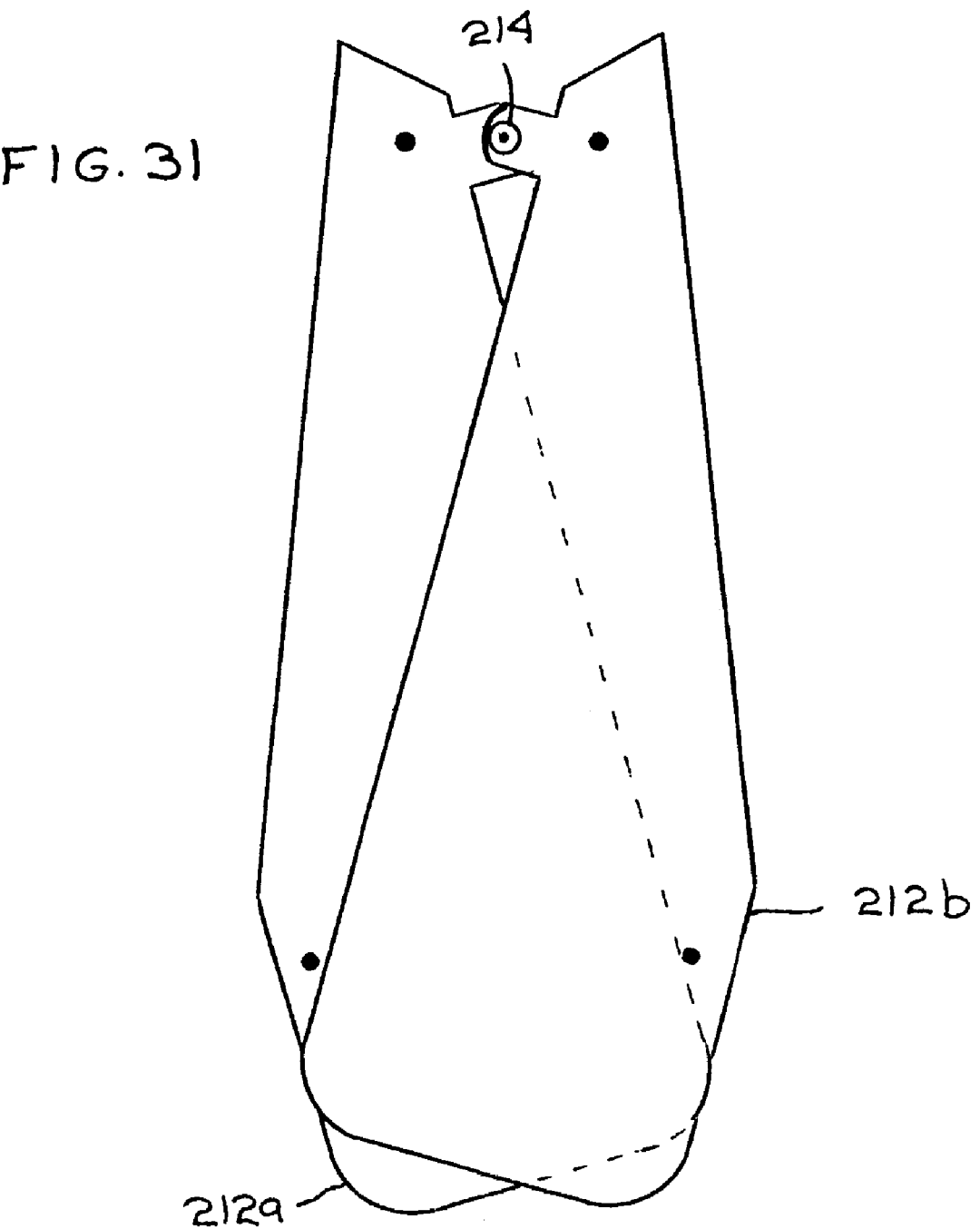
FIG. 31 is a bottom view of the tree stand platform of FIG. 29 shown in the folded condition.

A fan-folding platform assembly 86, shown in open and collapsed conditions in FIGS. 30 and 31, provides rigid wing sections 212a and 212b that overlap and pivot relative to each other at a pivot joint 214. The displacement of the platform sections 212a and 212b is established upon drawing the eyebolts 196 and crossbeam 108 tight to the sections 212a and 212b.

Figure 32:
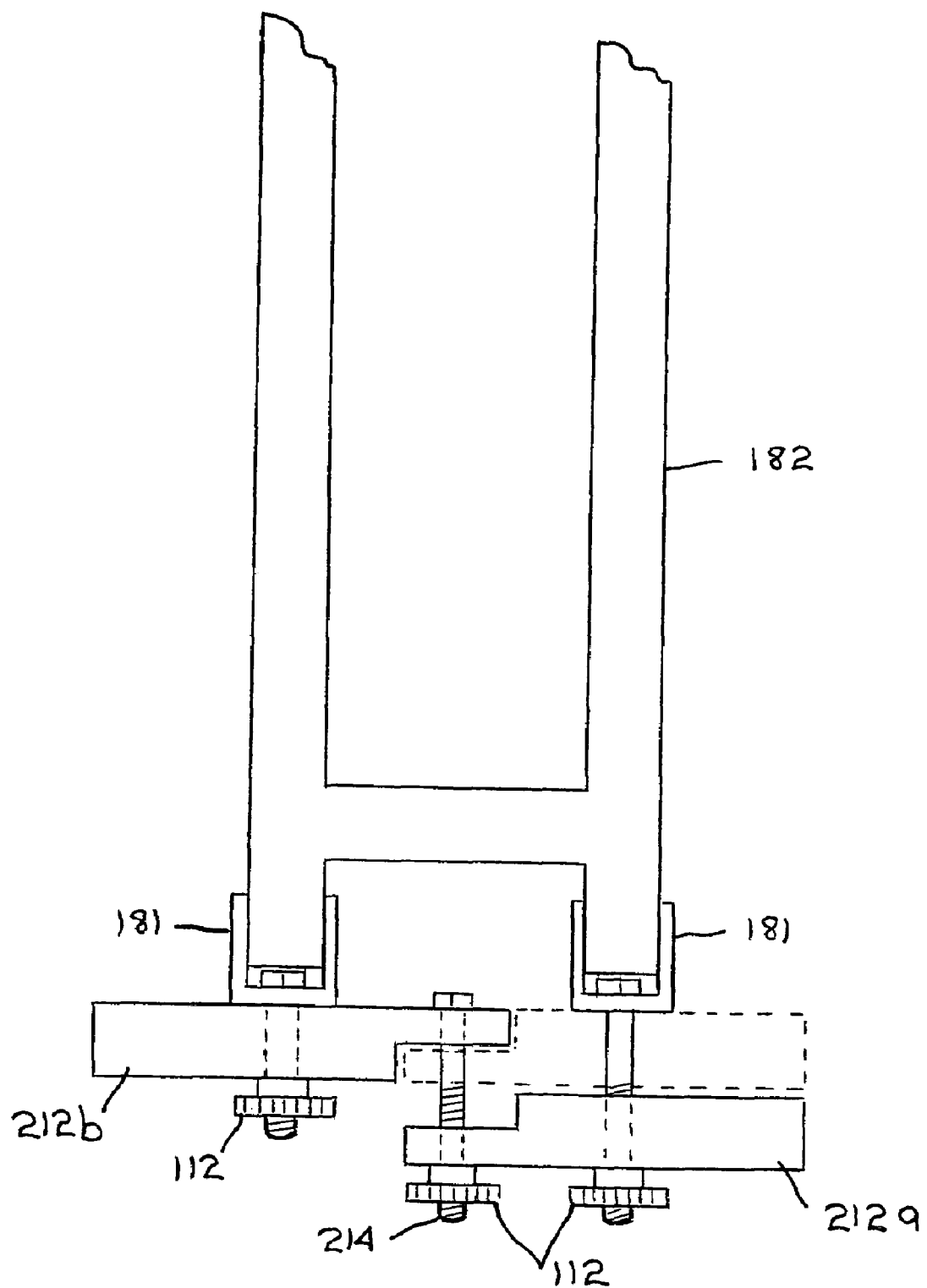
FIG. 32 is a fragmentary rear view to the platform sections of the tree stand of FIG. 29 showing the center platform pivot and the upright seat support member pivot hinges.

Details to the overlapping, rabbeted joint between the sections 212a and 212b and the mounting of one to the other are shown at FIG. 32. The manner of the mounting of the pivot brackets 181, pivot joint 214 and associated threaded fasteners and hand, draw nuts 112 are particularly apparent. The folding of the sections 212a and 212b is effected with the section 212a shown in solid line. The open condition is effected with the dashed line mounting of section 212a.

Figure 33:
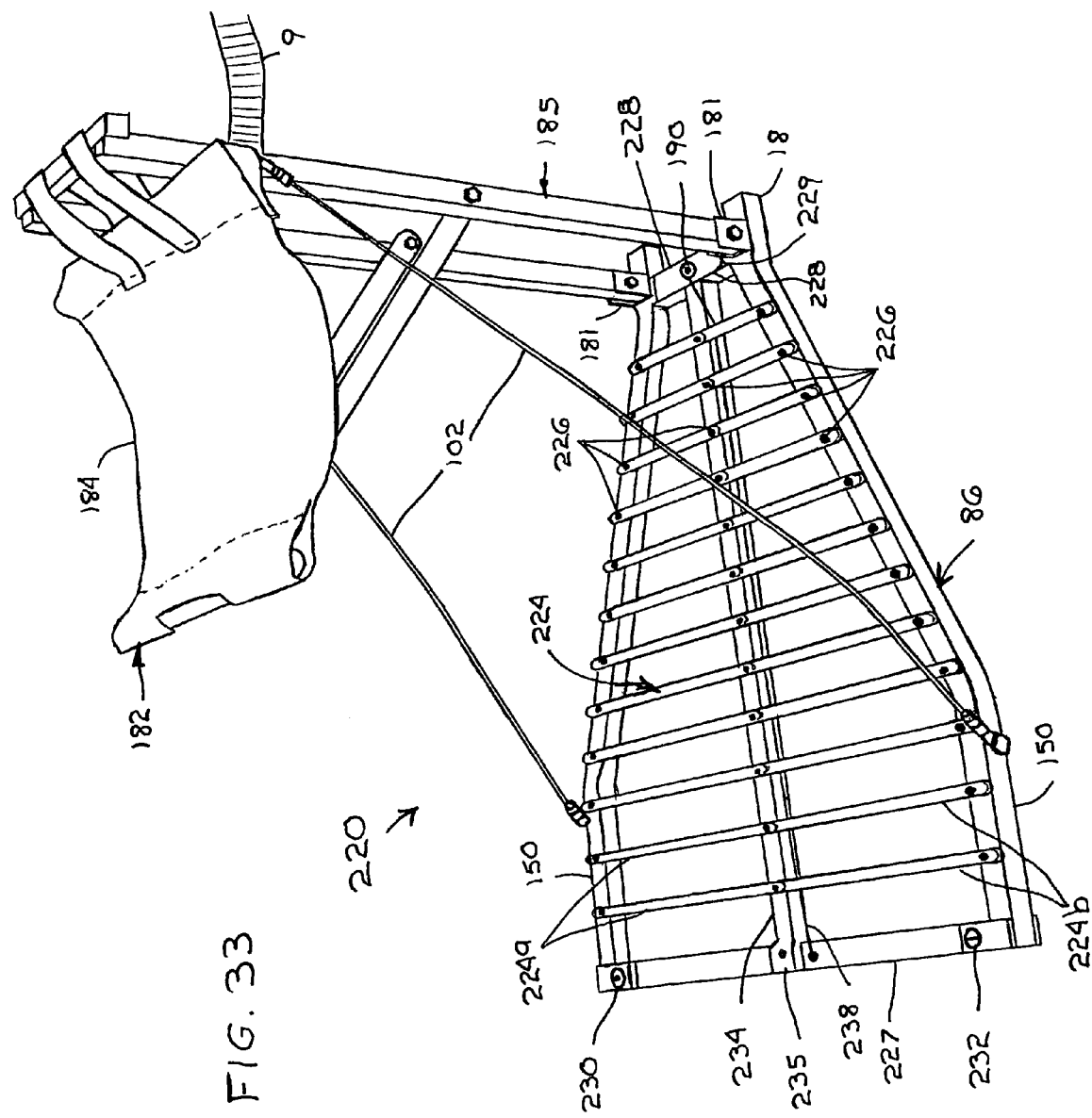
FIG. 33 is a perspective view of a tree stand having a platform with fan folding cross support members or stays that overlie and pivot from the frame members of a center pivot frame shown in an open condition.

FIG. 33 depicts yet another collapsing tree stand assembly 220. The stand 220 provides a multi-upright seat support assembly 185, folding seat assembly 182, folding, sling seat 184 and a length adjustable strap 9. The upright seat support assembly 185 is secured to pivot relative to a fan-fold support platform 86 at pivot brackets 181.

Figure 34:
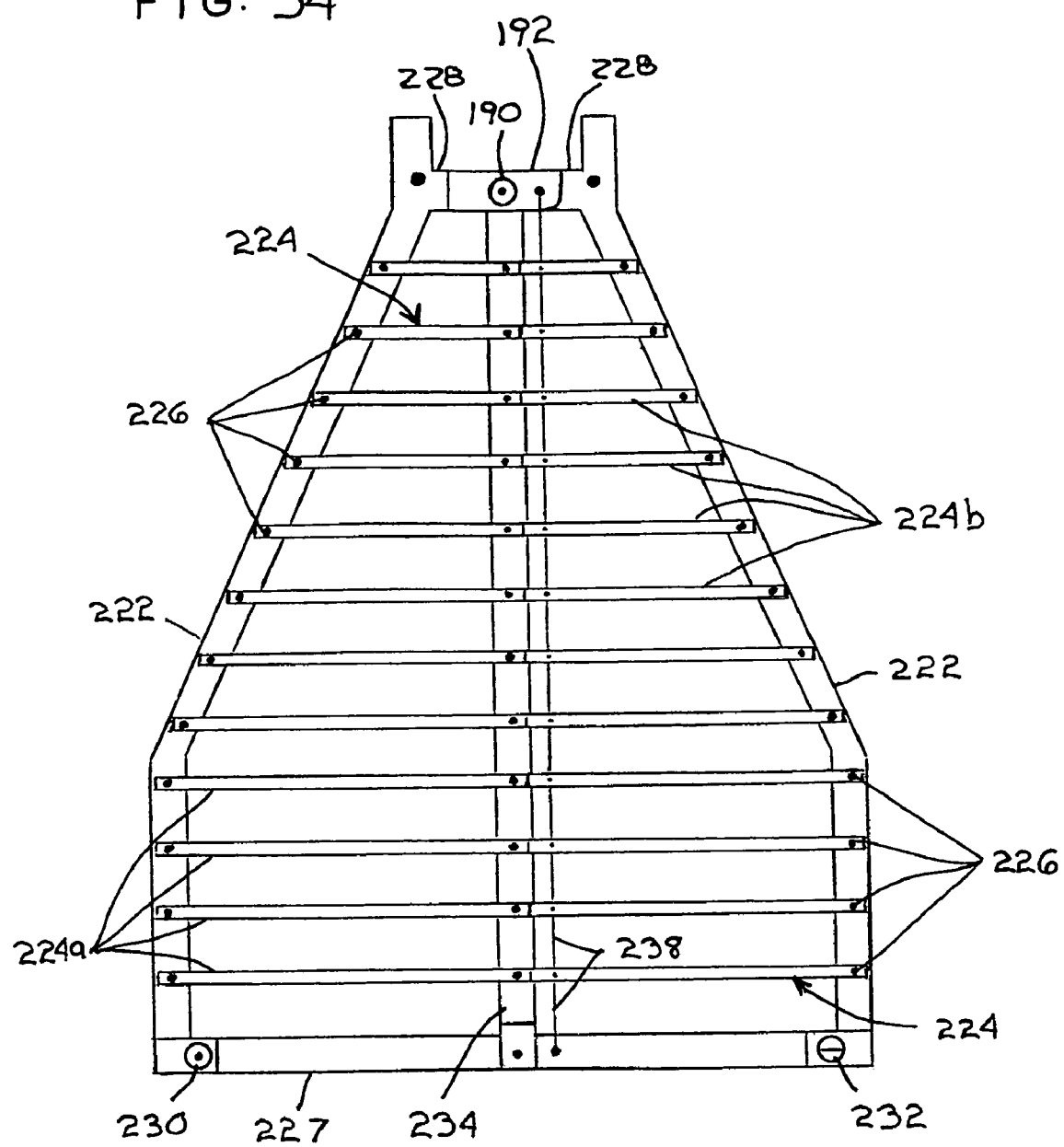
FIG. 34 is a top view of the tree stand platform of FIG. 33 showing the cross support members folded in an open condition.
Figure 35:
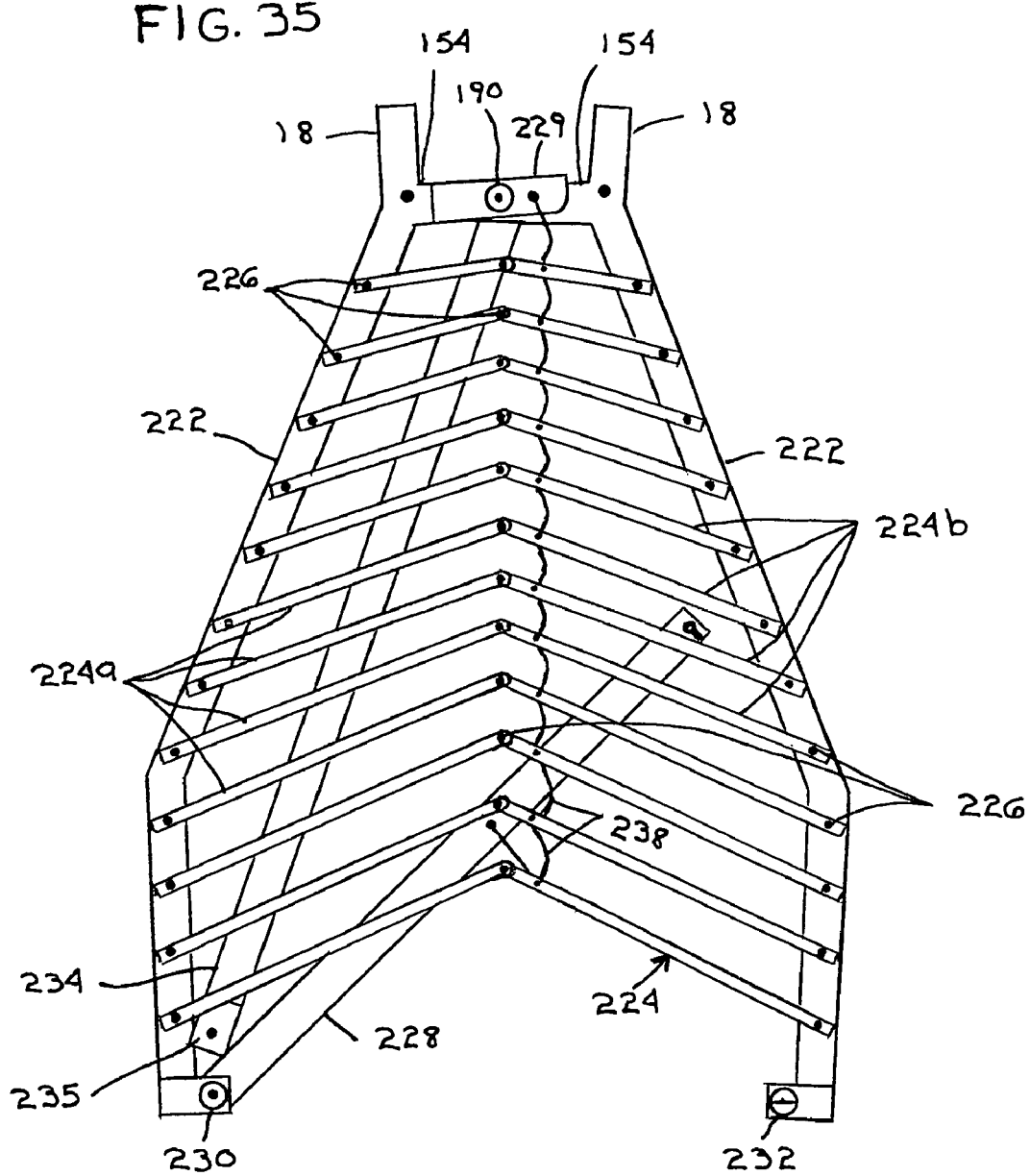
FIG. 35 is a top view of the tree stand platform of FIG. 33 showing the cross support members and an end frame support member in a semi-folded condition.
Figure 36:
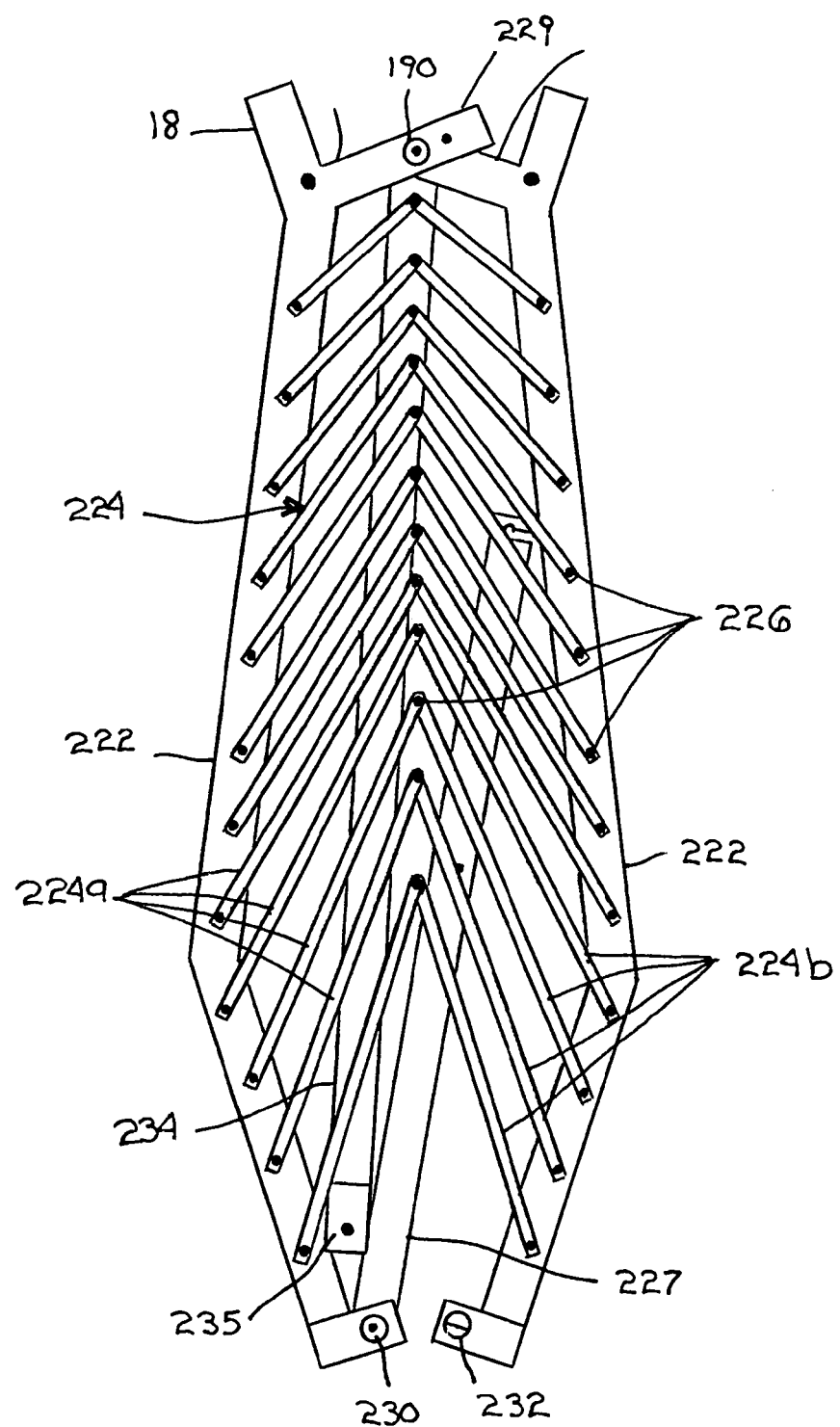
FIG. 36 is a top view of the tree stand platform of FIG. 33 showing the cross support members and end frame support folded to a transport condition.

The fan-folding platform assembly 86, shown in open and collapsed conditions in FIGS. 34 and 35, provides a pair of longitudinal perimeter frame members 222 and between which numerous two-section, transverse slats 224 extend. Each slat section 224a and 224b is secured to the other section and at an outer end to the perimeter members 222 with a pivot joint 226. Rigid arms 228 extend transverse to the aft ends of the perimeter members 222 and couple at a pivot 190. A latch arm 192 can be included to secure the joint. Alternatively, an end 229 of one arm 228 can be constructed to overlap and latch the other arm 228 against over-rotation.

The forward ends of the perimeter members 222 are displaced from one another with a cross member 227. The cross member 227 mounts to the end of one perimeter member 222 at a pivot joint 230 and to the end of another member 222 at a draw fastener 232 or other suitable fastener/coupler.

A longitudinal support member 234 having an end coupler 235 extends from the aft pivot 190 to the cross member 227. The coupler 235 at the opposite end straddles and fastens to the cross member 228 with a suitable fastener (e.g. lynch pin). The longitudinal support member 234 underlies the center pivot joints 226 of the slats 224. The spacing between slat sections 224a and 224b, when splayed open, is limited by a wire 238 or series of links that constrain the relative movement of the slats 224 with respect to each other.

Figure 37:
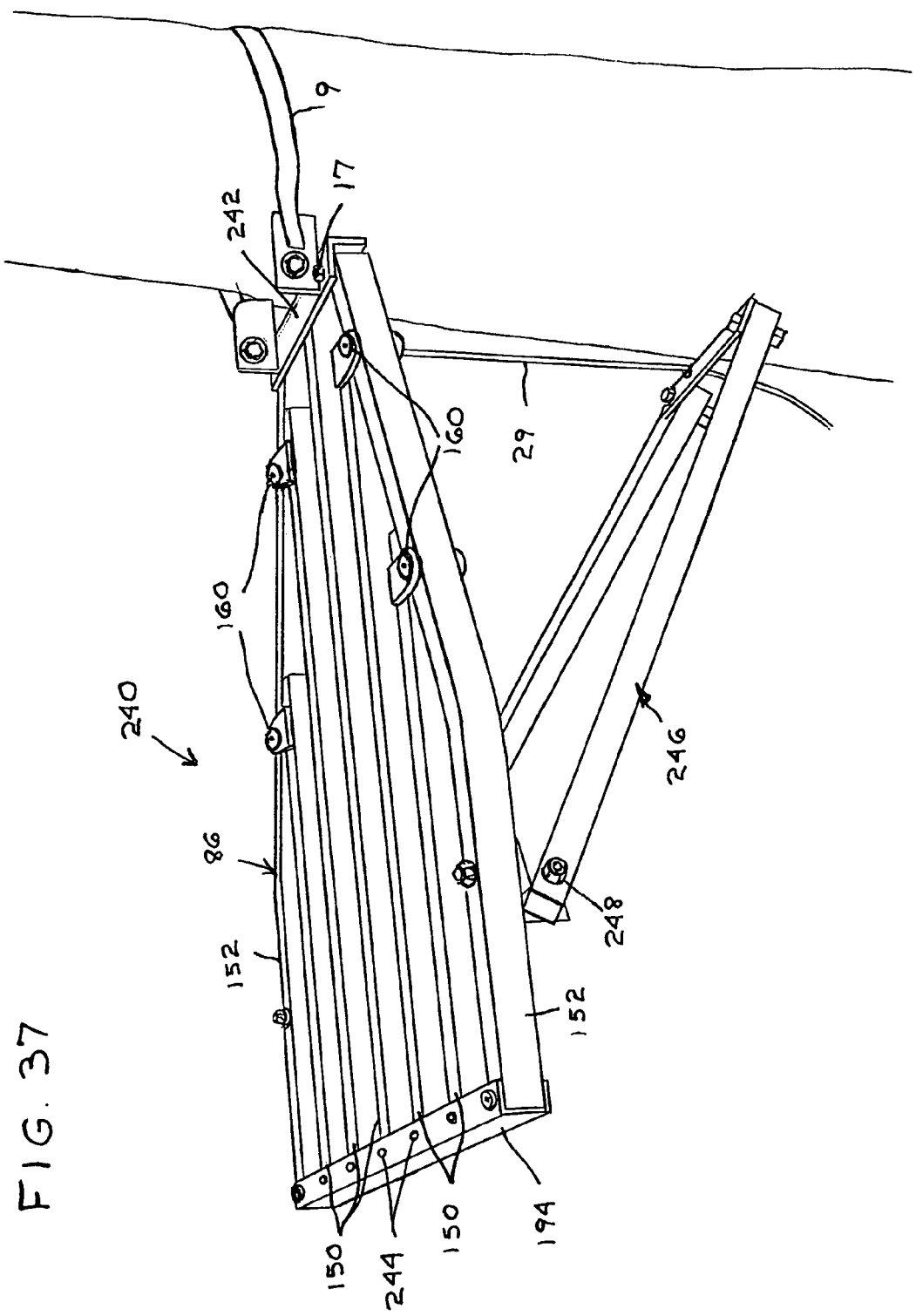
FIG. 37 is a perspective view of a tree stand having a platform with fan-folding frame members, an end cap support arm and a folding bottom, truss mounted brace arm shown in an open condition.
Figure 38:
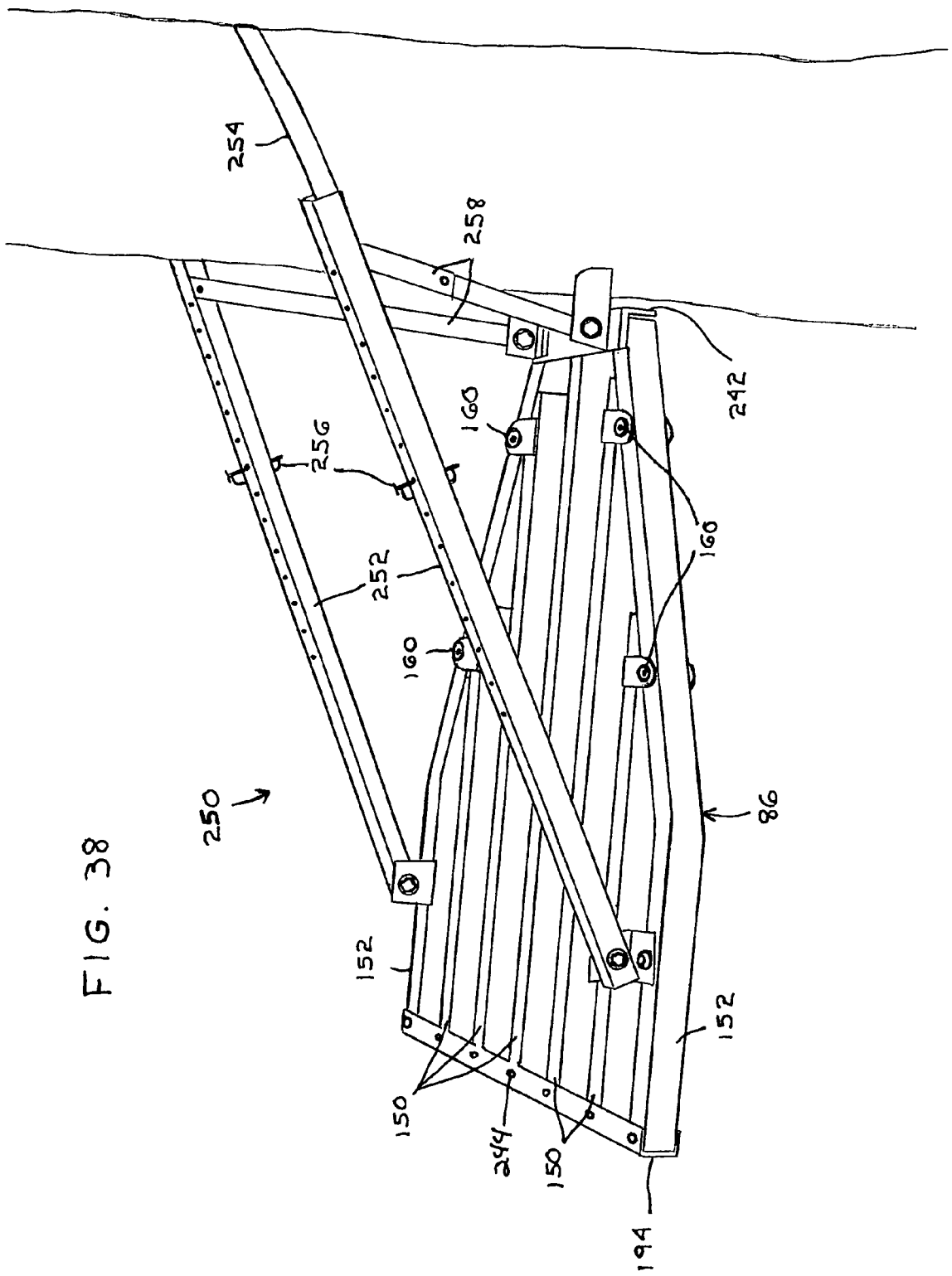
FIG. 38 is a perspective view of a tree stand having a platform with fan-fold supports, an end cap support arm, and folding, extensible upper truss arms shown in an open condition.

Two additional constructions of collapsing tree stand assemblies 240 and 250 are depicted in FIGS. 37 and 38. The stand 240 provides a fan-fold platform 86 constructed from longitudinal frame and perimeter members 150 and 152. The frame members 150 and 152 pivot at pivot joints 160. A cross piece 242 secures the aft ends of the perimeter members 152 and an end cap 194 retains the members 150. Lateral movement of the members 150 is restricted with detents 244 or hidden extensions from the end cap 194 that align with the members 150.

A truss bracket assembly 246 depends from the platform assembly 86 and pivots at a joint 248. An apex of the bracket 246 includes suitable spikes, saw tooth surfaces or the like to grip the tree after the stand 240 is levered to induce the cross member 242, which acts as a fulcrum surface, to engage the tree. A rope or other flexible member 249 can extend between the platform 86 and truss assembly 246 to fix the angular displacement.

FIG. 38 depicts yet another collapsing tree stand assembly 250 having a fan-fold platform 86 constructed from longitudinal frame and perimeter members 150 and 152. The frame members 150 and 152 pivot at pivot joints 160. A cross piece 242 secures the aft ends of the perimeter members 152 and an end cap 194 retains the members 150. Lateral movement of the members is restricted with detents 244 or hidden extensions at the end cap 194 that align with the members 150.

The platform assembly 86 is secured to the tree with arms 252 that pivot relative to the top of the platform 86 and a telescoping, length adjustable strap 254 that is secured to the arms 252 with restraints 256 (e.g. lynch pins). Folding, hinged uprights 258 control the angular separation between the arms 252 and platform 86.

Although each of the collapsing tree stands 180, 210, 220, 240 and 250 are shown with fan-fold platform assemblies 86, the foregoing stand assemblies can alternatively be constructed to fold in fashions similar to the stand assemblies 2, 70, 130 or 140. That is, the various versions of the general, collapsing platform assemblies 4 and 86 can be adapted to any desired combination with the various upright seat supports 6, 74 and 185 and disclosed seat assemblies to provide the most advantageous combination of longitudinal and lateral folding. Each configuration should be optimized to provide a stable, readily mounted stand, yet collapse to a relatively small configuration that facilitates transport. A cumbersome tree stand assembly can be especially difficult to mount, appreciating the user typically mounts the stand while standing on portable steps secured to the tree.

While the invention has been described with respect to a number of presently preferred constructions, the invention can be adapted to any of a variety of different combinations and permutations of the different disclosed features. That is, any of the disclosed multi-section platforms can be combined with any of the different upright seat supports, sling or rigid seats, straps, strap fasteners, pivots and/or cables and/or cable adjusters or the like. Various different platform shapes, materials and finishes (e.g. non-skid) may also be incorporated into any desired alternative tree stand. The scope of the invention should therefore be construed broadly within the spirit and scope of the following claims.

What is claimed is:

1. A tree stand assembly comprising:
   a) a platform having first and second planar sections coupled to one another by a plurality of pivot joints to pivot about said plurality of pivot joints and wherein said first and second sections are arranged to pivot between an open coplanar support condition and a folded transport condition;
   b) a primary support comprised of first and second members pivotally mounted to said platform by pivot joints having a first pivot axis to pivot between the open platform support condition wherein said primary support extends substantially orthogonal to said platform and said first and second members pivotally connected to each other by a pivot joint having a second pivot axis that is orthogonal to said first pivot axis such that said first and second members fold into substantially coplanar alignment to said first and second planar sections in the folded platform transport condition wherein the first and second planar sections are stacked one above the other and the first and second members stacked one above the other and sandwiched between said first and second planar sections; and
   c) a length adjustable member mounted to said primary support to secure said tree stand assembly to a tree.

2. A tree stand as set forth in claim 1 wherein said first and second planar sections comprise frameworks that respectively include a plurality of frame members and wherein first and second coaxially aligned pivot joints couple said first and second planar sections to each other.

3. A tree stand assembly as set forth in claim 1 including a seat mounted to said primary support.

4. A tree stand assembly as set forth in claim 1 including a detachable cross beam that mounts to transversely span a seam between said first and second planar sections defined by said pivot joints in said open condition.

5. A tree stand assembly comprising:
   a) a platform having first and second planar sections coupled to one another by a plurality of coaxially aligned pivot joints and arranged to pivot between an open coplanar support condition and a folded transport condition;
   b) a primary support comprised of first and second members respectively pivotally mounted to said first and second sections by pivot joints having a first pivot axis to pivot between the open platform support condition wherein said primary support extends substantially orthogonal to said platform and said first and second members pivotally connected to each other by a pivot joint having a second pivot axis that is orthogonal to said first pivot axis such that said first and second members pivot to fold into substantially parallel alignment with the pivot joints of said first and second sections at the folded platform transport condition, wherein the first and second sections are stacked one above the other and the first and second members stacked one above the other and sandwiched between said first and second sections;
   c) a truss support having a plurality of frame members mounted to said primary support to pivot about a third pivot axis and project at an acute angle relative to said primary support at the open platform support condition and also about a fourth pivot axis such that the truss support frame members pivot to fold into substantially coplanar alignment with the first and second sections at the folded transport condition;
   d) a seat coupled to said primary support and said truss support; and
   e) a length adjustable member mounted to said primary support to secure said tree stand assembly to a tree.

6. A tree stand as set forth in claim 5 including restraint means coupled to restrict the pivoting of said first and second sections in the open condition.

7. A tree stand assembly as set forth in claim 6 wherein said restraint means comprises a channel member pivotally mounted to said platform to selectively span a joint between said first and second planar sections in the open condition to restrain the pivoting of said first and second planar sections.

8. A tree stand assembly as set forth in claim 7 including a cable trained between said platform and said primary support.

9. A tree stand assembly as set forth in claim 8 including an adjuster for selectively varying the length of said cable and thereby the angular relationship of said platform to said primary support.

10. A tree stand assembly comprising:
    a) a platform comprising a plurality of frame sections coupled to one another by a plurality of pivot joints align to define a coplanar surface in an open support condition and wherein predetermined ones of the frame sections are mounted to pivot relative to the other frame sections such that the span of the platform in the open support condition can be reduced upon pivoting the predetermined frame sections to stack the platform frame sections in parallel alignment in a collapsed transport condition;
    b) a primary support comprising first and second members pivotally mounted to said platform by a plurality of pivot joints having a first pivot axis to pivot between the open platform support condition wherein said primary support extends substantially orthogonal to said platform and said first and second members pivotally connected to each other by a pivot joint having a second pivot axis that is orthogonal to said first pivot axis to fold into substantially parallel coplanar alignment along a common peripheral edge of the stacked platform frame sections in the collapsed transport condition;
    c) a truss support having a plurality of frame members mounted to pivot relative to said primary support about a third pivot axis to project at an acute angle relative to said primary support in the platform open support condition and also about a fourth pivot axis such that the truss support frame members pivot to fold into substantially parallel coplanar alignment along the common peripheral edge of the stacked platform frame sections in the collapsed transport condition, wherein the plurality of frame sections are stacked one above the other and the first and second members stacked one above the other and sandwiched between said first and second planar sections;
    d) a seat coupled to span between said primary support and said truss support; and
    e) a length adjustable member mounted to said primary support member to secure said tree stand assembly to a tree.

11. A tree stand as set forth in claim 10 including restraint means coupled to restrict the pivoting of said plurality of frame sections.

* * * * *